US012488042B2

(12) United States Patent
Sampaio De Rezende et al.

(10) Patent No.: US 12,488,042 B2
(45) Date of Patent: Dec. 2, 2025

(54) DATA COMPATIBILITY FOR TEXT-ENHANCED VISUAL RETRIEVAL

(71) Applicant: NAVER CORPORATION, Gyeonggi-do (KR)

(72) Inventors: Rafael Sampaio De Rezende, Grenoble (FR); Diane Larlus, La Tronche (FR); Ginger Delmas, Grenoble (FR); Gabriela Csurka Khedari, Crolles (FR)

(73) Assignee: NAVER CORPORATION, Gyeonggi-Do (KR)

( * ) Notice: Subject to any disclaimer, the term of this patent is extended or adjusted under 35 U.S.C. 154(b) by 518 days.

(21) Appl. No.: 17/847,848

(22) Filed: Jun. 23, 2022

(65) Prior Publication Data
US 2023/0073843 A1 Mar. 9, 2023

(30) Foreign Application Priority Data
Aug. 12, 2021 (EP) .................................... 21306114

(51) Int. Cl.
G06F 16/56 (2019.01)
G06F 16/532 (2019.01)
(Continued)

(52) U.S. Cl.
CPC ........ *G06F 16/5866* (2019.01); *G06F 16/532* (2019.01); *G06F 16/56* (2019.01);
(Continued)

(58) Field of Classification Search
None
See application file for complete search history.

(56) References Cited

U.S. PATENT DOCUMENTS 10,678,846 B2    6/2020  Gordo Soldevila et al.
11,138,469 B2   10/2021  Almazan et al.
(Continued)

FOREIGN PATENT DOCUMENTS

CN     110222560 A  *  9/2019  .......... G06F 18/214
CN     112818140 A  *  5/2021  ............ G06F 16/43
(Continued)

OTHER PUBLICATIONS

Liu, Z.—"Image Retrieval on Real-life Images with Pre-trained Vision-and-Language Models"—arXiv—Aug. 9, 2021—pp. 1-20 (Year: 2021).*
(Continued)

*Primary Examiner* — Bernard Krasnic

(57) ABSTRACT

An interaction module includes: a first text-image interaction module configured to generate a vector representation of a first text-image pair based on an encoded representation of a reference image and an encoded representation of a text modifier, the reference image and the text modifier received from a computing device. A second text-image interaction module is configured to generate a vector representation of a second text-image pair based on the encoded representation of the text modifier and an encoded representation of a candidate target image. A compatibility module is configured to compute, based on the vector representation of the first text-image pair and the vector representation of the second text-image pair, a compatibility score for a triplet including the reference image, the text modifier, and the candidate target image. A ranking module is configured to rank a set of candidate target images including the candidate target image by compatibility scores.

31 Claims, 10 Drawing Sheets

(51) Int. Cl.
  *G06F 16/58* (2019.01)
  *G06F 40/30* (2020.01)
  *G06V 10/774* (2022.01)
  *G06V 10/82* (2022.01)
(52) U.S. Cl.
  CPC ............ *G06F 40/30* (2020.01); *G06V 10/774* (2022.01); *G06V 10/82* (2022.01)

(56) References Cited

U.S. PATENT DOCUMENTS

2018/0373955 A1  12/2018  Soldevila et al.
2021/0073252 A1  3/2021  Guo et al.

FOREIGN PATENT DOCUMENTS

EP            3754548 A1  12/2020
WO   WO-2019011936 A1   1/2019

OTHER PUBLICATIONS

Antol, Stanislaw, Aishwarya Agrawal, Jiasen Lu, Margaret Mitchell, Dhruv Batra, C. Lawrence Zitnick, and Devi Parikh. "VQA: Visual Question Answering." In 2015 *IEEE International Conference on Computer Vision (ICCV)*, 2425-33. Santiago, Chile: IEEE.
Anwaar M. U. et al., "Compositional learning of text-image query for image retrieval", Proc. WACV, pp. 1140-1149, 2021.
Berg. T. L. et al., "Automatic attribute discovery and characterization from noisy web data", *Proc ECCV*, pp. 663-676, 2010.
Chen Y. et al., "Learning join visual semantic matching embeddings for language-guided retrieval", Proc. ECCV, 2020.
Chen, Yanbei, Shaogang Gong, and Loris Bazzani. "Image Search With Text Feedback by Visiolinguistic Attention Learning." In 2020 *IEEE/CVF Conference on Computer Vision and Pattern Recognition (CVPR)*, 2998-3008. Seattle, WA, USA: IEEE, 2020.
Cho, Kyunghyun, Bart van Merrienboer, Caglar Gulcehre, Dzmitry Bahdanau, Fethi Bougares, Holger Schwenk, and Yoshua Bengio. "Learning Phrase Representations Using RNN Encoder-Decoder for Statistical Machine Translation." *ArXiv:1406.1078 [Cs, Stat]*, Sep. 2, 2014.
Chun S. et al., "Probabilistic embeddings for cross-modal retrieval, *arXix: 2101.05068*, 2021 and Musgrave K. et al., A metric learning reality check", *Proc ECCV*, pp. 681-699, 2020.
Culpepper, Jack, Eric Dodds, and Simao Herdade. "Transforming Image Representations via Attribute Operators," Technical report from the Fashion IQ Challenge. 2019.
European Search Report for European Application No. 21306114.6 mailed Feb. 4, 2022.
Faghri, F. et al., "VSE++: Improving visual-semantic embeddings with hard negatives", *Proc. BMVC*, 2018.
Frome. A. et al., Devise: A deep visual-semantic embedding model, *Proc. NeurIPS*, 2013.
Gao Y. et al., "Fashion IQ Challenge", Third Workshop on Computer Vision for Fashion, Art and Design, CVPRW, 2020. https://sites.google.com/view/cvcreative2020/fashion-ig.
Guo X. et al., "The Fashion IQ Dataset: Retrieving images by combining side information and relative natural language feedback", *arXiv: 1905.12794*, 2019.
Guo Xioaxiao et al., "Dialog-based interactive image retrieval" in S. Bengio et al., editors, *Proc. Neur IPS*, pp. 676-686, Curran Associates Inc., 2018.
Han, Xintong, Zuxuan Wu, Phoenix X Huang, Xiao Zhang, Menglong Zhu, Yuan Li, Yang Zhao, and Larry S Davis. "Automatic Spatially-Aware Fashion Concept Discovery," ICCV, 2017.
He, Kaiming, Xiangyu Zhang, Shaoqing Ren, and Jian Sun. "Deep Residual Learning for Image Recognition." In 2016 *IEEE Conference on Computer Vision and Pattern Recognition (CVPR)*, 770-78. Las Vegas, NV, USA: IEEE, 2016.
Katrien Laenen et al., "Cross-modal search for fashion attributes", Proceedings of the KDD 2017 Workshop on Machine Learning Meets Fashion, Aug. 14, 2017, XP055502261.
Kim, Jongseok, Youngjae Yu, and Seunghwan Lee. "Cycled Compositional Learning between Images and Text," Technical report from the Fashion IQ Challenge. 2020.
Kingma D.P. and Ba J., "Adam: A method for stochastic optimization", *Proc. ICLR*, 2014.
Lee, Kuang-Huei, Xi Chen, Gang Hua, Houdong Hu, and Xiaodong He. "Stacked Cross Attention for Image-Text Matching." In *Computer Vision—ECCV* 2018, edited by Vittorio Ferrari, Martial Hebert, Cristian Sminchisescu, and Yair Weiss, 11208:212-28. Lecture Notes in Computer Science. Cham: Springer International Publishing, 2018.
Li, Jianri, Jae-whan Lee, Woo-sang Song, Ki-young Shin, and Byung-hyun Go. "Designovel's System Description for Fashion-IQ Challenge 2019." *ArXiv:1910.11119 [Cs]*, Oct. 21, 2019.
Liu Y. et al., "Use what you have: Video retrieval using representations from collaborative experts", Proc. BMVC, 2019.
Liu, Xin, Jiancheng Li, Jiaqi Wang, and Ziwei Liu. "MMFashion: An Open-Source Toolbox for Visual Fashion Analysis." *ArXiv:2005.08847 [Cs]*, May 18, 2020.
Liu, Zheyuan, Cristian Rodriguez-Opazo, and Stephen Gould. "ResEFNet: Technical Report for the Fashion-IQ Interactive Image Retrieval Challenge," Technical report from the Fashion IQ Challenge. 2019.
Liu, Ziwei, Ping Luo, Shi Qiu, Xiaogang Wang, and Xiaoou Tang. "DeepFashion: Powering Robust Clothes Recognition and Retrieval with Rich Annotations." In 2016 *IEEE Conference on Computer Vision and Pattern Recognition (CVPR)*, 1096-1104. Las Vegas, NV, USA: IEEE, 2016.
Musgrave K. et al., "A metric learning reality check", *Proc ECCV*, pp. 681-699, 2020.
Pennington, Jeffrey, Richard Socher, and Christopher Manning. "Glove: Global Vectors for Word Representation." In *Proceedings of the 2014 Conference on Empirical Methods in Natural Language Processing (EMNLP)*, 1532-43. Doha, Qatar: Association for Computational Linguistics, 2014.
Perez, Ethan, Florian Strub, Harm de Vries, Vincent Dumoulin, and Aaron Courville. "FiLM: Visual Reasoning with a General Conditioning Layer." *ArXiv:1709.07871 [Cs, Stat]*, Dec. 18, 2017.
Rostamzadeh, Negar, Seyedarian Hosseini, Thomas Boquet, Wojciech Stokowiec, Ying Zhang, Christian Jauvin, and Chris Pal. "Fashion-Gen: The Generative Fashion Dataset and Challenge." *ArXiv:1806.08317 [Cs, Stat]*, Jul. 30, 2018.
Russakovsky, Olga, Jia Deng, Hao Su, Jonathan Krause, Sanjeev Satheesh, Sean Ma, Zhiheng Huang, et al. "ImageNet Large Scale Visual Recognition Challenge." *International Journal of Computer Vision* 115, No. 3 (Dec. 2015): 211-52.
Santoro, Adam, David Raposo, David G Barrett, Mateusz Malinowski, Razvan Pascanu, Peter Battaglia, and Timothy Lillicrap. "A Simple Neural Network Module for Relational Reasoning," In Advances in neural information processing systems, 2017.
Selvaraju R.R. et al., Grad-cam: Visual explanations from deep networks via gradient-based localization, *Proc ICCV*, pp. 618-626, 2017.
Shin, Minchul, Yoonjae Cho, and Seongwuk Hong. "Fashion-IQ 2020 Challenge 2nd Place Team's Solution," Technical report from the Fashion IQ Challenge. 2020.
Song, Yale, and Mohammad Soleymani. "Polysemous Visual-Semantic Embedding for Cross-Modal Retrieval." In 2019 *IEEE/CVF Conference on Computer Vision and Pattern Recognition (CVPR)*, 1979-88. Long Beach, CA, USA: IEEE, 2019.
Tan M et al., "Efficientnet: Rethinking model scaling for convolutional neural networks", *Proc ICML*, pp. 6105-6114, PMLR, 2019.
Vinyals, Oriol, Alexander Toshev, Samy Bengio, and Dumitru Erhan. "Show and Tell: A Neural Image Caption Generator." In 2015 *IEEE Conference on Computer Vision and Pattern Recognition (CVPR)*, 3156-64. Boston, MA, USA: IEEE, 2015.
Vo Nam et al., "Composing Text and Image for Image Retrieval—an Empirical Odyssey", 2019 IEEE/CVF Conference on Computer Vision and Pattern Recognition (CVPR), IEEE, Jun. 15, 2019, pp. 6432-6441, XP033686476.

(56) References Cited

OTHER PUBLICATIONS

Wu, Hui, Yupeng Gao, Xiaoxiao Guo, Ziad Al-Halah, Steven Rennie, Kristen Grauman, and Rogerio Feris. "Fashion IQ: A New Dataset Towards Retrieving Images by Natural Language Feedback." ArXiv:1905.12794 [Cs], Nov. 25, 2020.

Yu, Youngjae, Seunghwan Lee, and Yuncheol Choi. "CurlingNet: Compositional Learning between Images and Text for Fashion Data," Technical report from the Fashion IQ Challenge. 2019.

Zhao Y. et al., RUC-AIM3: Improved TIRG Model for Fashion-IQ Challenge 2020, Technical report from the Fashion IQ Challenge, 2020.

\* cited by examiner

DATA COMPATIBILITY FOR TEXT-ENHANCED VISUAL RETRIEVAL

CROSS-REFERENCE TO RELATED APPLICATIONS

This application claims the benefit of European Application No. EP21306114.6, filed on Aug. 12, 2021. The entire disclosure of the application referenced above is incorporated herein by reference.

FIELD

The present disclosure relates to image retrieval in response to a query including both a textual description and an example image. More particularly, the present disclosure relates to the use of neural networks to rank stored images according to their degree of relevance to the query (including both a textual description and an example image).

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Search engines enable retrieval of images based on a textual query describing what the user is looking for. This may be referred to as cross-modal search where a query in a first modality (text) is used to find search results in a second modality (images). Some search engines also aim to return images that are similar to an image query, which may be referred to as image search or visual search.

However, limiting queries to a single modality may be restrictive. On the one hand, the textual query proposes an accurate but only partial description of the desired search results, but it is difficult to provide an exhaustive textual description. On the other hand, visual queries are much richer but a lot more ambiguous, and it may be difficult to find a query image that corresponds to what a user is looking for. The search engine may be guessing which characteristics the user wants to maintain for the query image.

The task of image searching with free-form text feedback proposes to reduce the ambiguity of visual search by allowing a dual query including an example image (a reference image) and a textual description (a text modifier) which explains how the reference image should be modified to obtain the desired results (such that a target image should be ranked first). For example, a user provides an image of a striped dress (the reference image) and a text description of what the user is looking for relative to the image, such as "a shorter red dress with no pattern" (the text modifier). The goal is then to retrieve an image of a dress similar to the striped dress but red in color with no pattern (no stripes) and is shorter in length. This task is referred to as "text-enhanced visual retrieval".

Despite being intuitive, this task has so far received limited attention. First, the task has been restricted to simple attribute modifiers with attributes being part of a predefined vocabulary. Modifiers in natural language may not be considered. Dialog-based image retrieval may be used.

In this scenario, a search engine needs to combine information coming from two different modalities to properly rank candidate images. One approach may be to explicitly learn to compose the representations of the reference image and of the textual modifier to produce a final "visual" representation which can be directly compared with those of potential target images (candidate images).

While purely visual queries may be used for the task of instance-level image retrieval, vision and language models may also be used for visual search tasks. A visual search scenario involving the text modality is cross-modal retrieval, where a textual description of the image of interest is provided as a query. This task may involve learning a joint embedding space for matching images and text with a Euclidean distance. The problem of learning this visual-semantic metric space may be addressed with multi-modal and bidirectional triplet ranking. For example, a hardest-negative mining strategy may be used in their training pipelines.

In order to improve expressivity of the query, visual queries may be extended with text feedbacks for visual search. Interactive image retrieval may incorporate fixed-form user feedback, such as (binary) relative relevance of several propositions with regard to a wanted item (e.g., similar vs dissimilar), or, in a less restrictive and more natural way, relative attributes (e.g., more formal than, more bright in color than). Based on the idea that modifiers have similar effects over different basic elements, linear transformations may learn for each modifier (e.g. attributes, adverbs) that can be applied to reference visual features. However, feedback in such a constrained form limit the user who cannot fully express his or her search intent. Natural language provides a more natural alternative and allows to precisely describe how to modify the reference image to get to the target image.

The task of image search with free-form text feedback may include composing the features of the two query elements into a single joint representation that is then compared to any potential target image feature. Some first baseline composition modules are directly adapted from the visual question answering task.

To reason about features from different modalities, a sequence of two MLPs (multi-layer perceptrons) may be used with a plug-and-play module to do relational reasoning, by computing relations within a set of input objects, with for main advantages the use of a single function for any possible pair and the superfluity of knowing which relations actually exist and their meaning. Encoders generally may not have the capacity to perform reasoning and may simply focus on building good representations. In various implementations, a CNN (convolutional neural network) and LSTM (long-short term memory network) features may be used. Several experts (corresponding to modality-specific representations) may be combined within a collaborative gating module. In various implementations, text features may be injected into the image convolutional neural network at different layers, altering its behavior to perform complex modification operations, based on the idea that feature-wise affine conditioning is effective for multi-step reasoning.

Conversely, Text Image Residual Gating (TIRG) may be applied to a single layer of the CNN. In TIRG, the reference image and the relative captions are fused through a gating-residual mechanism, and the text feature acts as a bridge between the two images in the visual representation space. A motivation for balancing features that come from gating-residual connections may be that one wants to modify the image feature based on the text feature (and only retain the reference image, when the text modification is insignificant). The gated identity may preserve the reference image while the residual connection brings in the text modification. In various implementations, an autoencoder-based model may be used to map reference and target images into the same complex space and learn the text modifier representation as a transformation in this space.

TIRG may be comparable to other architectures, such as an architecture where the image feature is fed into a LSTM, followed by words in the text. In this context, the final state of the LSTM represents the query feature that can therefore be used to retrieve the target image. TIRG may outperform other architectures, such as because text is used to modify the image space instead of forcing the two modalities to live in the same space.

Another architecture may use products' descriptive text as side information to train a joint visual-semantic space and then train a TIRG model on top. The alignment of visual and textual features for regularization may be used in other architectures such as an architecture that inserts a composite transformer at different levels of the visual encoder to preserve and transform the visual content depending on the text modifier, at different depths of the network (to capture details of different granularities). Specifically, at a given level, a visiolinguistic feature is formed from the image and text features (through concatenation and MLP). Self-attention is then used to learn what should be transformed, while joint-attention with the image feature informs about what should be preserved. Besides a triplet loss to align the modified feature with the target image feature, an auxiliary loss using descriptive texts as side information acts as regularization by aligning visual and text features in a visual-semantic space.

In an image retrieval task, the input query may be specified in the form of a candidate image and two natural language expressions which describe the visual differences of the search target. TIRG or a modified version of TIRG may be used where the text only appears in the residual feature and is absent from the gating computation. Pretraining may also be used, for instance retrieval, attribute prediction and (in-shop) image retrieval tasks. Fashion attributes may be used as complementary information.

There is a need to address the problem of image search using cross-modal queries. There is a need for systems and methods of information retrieval that addresses the above disadvantages.

SUMMARY

Further areas of applicability of the present disclosure will become apparent from the detailed description, the claims and the drawings. The detailed description and specific examples are intended for purposes of illustration only and are not intended to limit the scope of the disclosure.

The present disclosure addresses the task of text-enhanced image retrieval: a user wishes to find an image using a multi-modal query including a reference image and a text modifier. In general, the query image serves as a starting point, while the text modifier describes the target image relative to the reference image. In other words, the text modifier provides additional information about the modifications to be made to the reference image to obtain the desired target image. A goal of the systems and method described herein is to search a database of images for a target image that corresponds to the reference image modified according to the text modifier. This may be thought of as a ranking problem in which a neural network is trained to rank many candidate triplets each including the query, the text modifier, and a candidate target image according to their compatibility.

The complexity of the text-enhanced visual retrieval task derives from being multi-modal and multi-instance. For a given query including a reference image and a text modifier, and a given target image, the retrieval system must not only model interactions between visual and textual information, but also model the interactions between three sources of information. Learning a composition of the query components that can be directly compared to the candidate images can be used. This leaves out two pieces of interaction information however: between the target image and the reference image; and between the target image and the text modifier.

The text modifier is a strong cue, as it explicitly mentions important aspects of the target image. Moreover, the reference image provides more subtle but equally important information about the article context: some characteristics of the reference image strongly influence the choice of wording from the annotator, even if they are not explicitly mentioned in the text.

A first example implementation is based on the idea that there is a relation between all elements of the triplet (including the reference image, the text modifier, and the target image). The aim is to leverage all pairwise interactions within the triplet in order to better measure the "relationship compatibility" of the elements. A compatibility model, including interaction modules that measure pairwise relationships, and a compatibility module, that outputs a compatibility score of these pairwise relationships is described.

Pairwise relationships of a triplet may be used to measure the triplet's compatibility. A novel metric learning problem is solved by maximizing a legitimate (correct) triplet's compatibility with respect to dissenting triplets, where a dissenting triplet is a triplet in which one of the elements belongs to a different correct triplet. This is achieved by first computing the interaction between the two elements of the query, then the interactions between the text modifier and all possible candidate target images (as well as the interactions between the reference image and all possible candidate target images, if image-image interaction is also taken into account). Next, a compatibility score is calculated from the interactions for every candidate target image. The candidate target images are ranked in order according to the compatibility score.

A second embodiment builds on attention mechanisms, and decomposes the problem into two complementary views. An explicit matching model measures the acceptability of a target image regarding the properties mentioned in the text of the query. An implicit similarity model considers the affinity between the reference and the target images from the viewpoint of the textual modifier. The two models are trained jointly. Specifically, querying for items with the combination of a reference image and a textual modifier can be viewed as the combination of two types of queries: an explicit query about precise properties unambiguously required by the text modifier, and an implicit query which comes from the visual context provided by the reference image.

In a feature, a system for image retrieval employs a neural network architecture. The system includes an interaction module and a compatibility module. The interaction module includes a first text-image interaction neural network trained to generate a vector representation of a first text-image pair based on an encoder representation of a reference image and an encoder representation of a text modifier where the text modifier describes at least one visual difference between the target image and the reference image. The interaction module further includes a second text-image interaction neural network trained to generate, for each candidate target image of a set of candidate target images, a vector representation of a second text-image pair based on the encoder representation of the text modifier and an encoder representation of a respective candidate target image. The compatibility module is configured to compute, based on the vector representation of the first text-image pair and the vector representation of the second text-image pair, a compatibility score for each triplet of a set of triplets, each triplet comprising the reference image, a candidate target image of the set of candidate target images and the text modifier. The compatibility score for each triplet is proportional to a degree to which the respective candidate target image corresponds to the target image. The compatibility score is used to rank the candidate target images in order of similarity to the target image.

The neural network architecture provides for reliable image searching and retrieval, which is computationally efficient (i.e., has reduced computational cost) because the neural network architecture has fewer parameters and has lighter computation complexity at inference time than other solutions.

In a feature, computing the compatibility score based on the vector representation of the first text-image pair and the vector representation of the second text-image pair may include computing a cosine similarity between the vector representation of the first text-image pair and the vector representation of the second text-image pair. Computing the compatibility score based on the vector representation of the first text-image pair and the vector representation of the second text-image pair further may further include computing a cosine similarity between the vector representation of the second text-image pair and the encoder representation of the text modifier. The compatibility score may be based on a sum of the cosine similarity between the vector representation of the first text-image pair and the vector representation of the second text-image pair and the cosine similarity between the vector representation of the second text-image pair and the encoder representation of the text modifier.

In a feature, the first text-image interaction neural network may use a first attention mechanism on the text modifier and applied to the reference image to generate the vector representation of the first text-image pair, and the second text-image interaction neural network uses a second attention mechanism on the text modifier and applied to a respective candidate target image to generate the vector representation of the second text-image pair.

Because the textual modifier is used as an attention mechanism to weigh the dimensions of the visual features, the neural network model has fewer parameters to learn and lighter computation complexity at inference time on the query side. This results in a more scalable solution for retrieving images.

In a feature, the compatibility module includes a compatibility neural network trained to compute the compatibility score for each triplet of the set of triplets.

By leveraging the interactions between at least two elements of the triplets, the neural network provides for more reliable image search.

In a feature, the interaction module may further include an image-image interaction neural network trained to generate, for each candidate target image of the set of candidate target images, a vector representation of an image-image pair based on the encoder representation of the reference image and the encoder representation of a respective candidate target image. The compatibility score may be further based on the vector representation of the image-image pair.

Leveraging all relationships between the elements of the triplets provides for further improvements in the reliability of the image search.

In a feature, the image-image interaction neural network may be a multi-layer perceptron (MLP) neural network. The first text-image interaction neural network may be a first text-enhanced image retrieval (TIRG) neural network and the second text-image interaction neural network is a second text-enhanced image retrieval (TIRG) neural network. Alternatively, the first text-image interaction neural network may be a first MLP neural network and wherein the second text-image interaction neural network may be a second MLP neural network.

In a feature, the neural networks may be trained using a training data set that includes compatible triplets and incompatible triplets. Each compatible triplet includes a candidate target image that corresponds to a reference image of the respective compatible triplet modified according to a text modifier of the respective compatible triplet. An incompatible triplet includes a candidate target image that does not correspond to a reference image of the respective incompatible triplet modified according to a text modifier of the respective incompatible triplets. Each incompatible triplet may be generated from a pair of compatible triplets.

Training the neural networks using both positive and negative examples improves the reliability of the trained neural network for image retrieval. Further, generating the incompatible triplets from the set of compatible triplets increases the amount of training data available, thereby improving reliability after training.

In a feature, the system may further include at least one visual encoder neural network trained to generate the encoder representation of the reference image and the candidate target images, and a textual encoder neural network trained to generate the encoder representation of the text modifier.

The at least one visual encoder neural network and the textual encoder neural network may be trained using cross-modal retrieval prior to training the neural networks of the first interaction module, the second interaction module, and the compatibility module.

Pre-training the encoder modules before separately training the neural networks of the interaction module and the compatibility module reduces the computational cost at training time.

In a feature, the system may further include a query input module configured to display, on a user interface, a list of the candidate target images ranked in according to the compatibility score. The query input module may be configured to receive, via the user interface, a query including the reference image and the text modifier.

In a feature, the system may further include a pre-ranking module configured to, in response to receiving the query, rank candidate target images stored in a database of candidate target images using a cross-modal model or query-composition retrieval model.

Pre-ranking reduces the computational cost of performing the image retrieval and therefore improvise scalability.

In a feature, there is provided a computer-implemented method for image retrieval. The method includes receiving a query for obtaining a target image, the query comprising a reference image and a text modifier, where the text modifier describes at least one visual difference between the target image and the reference image. The method further includes generating a vector representation of a first text-image pair based on an encoder representation of the reference image and an encoder representation of the text modifier, and generating, for each candidate target image of a set of candidate target images, a vector representation of a second text-image pair based on the encoder representation of the text modifier and an encoder representation of a respective candidate target image. The method further includes computing, based on the vector representation of a first text-image pair and the vector representation of a second text-image pair, a compatibility score for each triplet of a set of triplets, each triplet including the reference image, a candidate target image of a set of candidate target images and the text modifier. The compatibility score for each triplet is proportional to a degree to which the respective candidate target image corresponds to the target image. The compatibility score is used to rank the candidate target images in order of similarity to the target image.

In a feature, computing the compatibility score may include computing a cosine similarity between the vector representation of the first text-image pair and the vector representation of the second text-image pair. Computing the compatibility score may further include computing a cosine similarity between the vector representation of the second text-image pair and the encoder representation of the text modifier. The compatibility score may be based on a sum of the cosine similarity between the vector representation of the first text-image pair and the vector representation of the second text-image pair and the cosine similarity between the vector representation of the second text-image pair and the encoder representation of the text modifier.

In a feature, the vector representation of the first text-image pair may be generated using a first attention mechanism on the text modifier and applied to the reference image to generate the vector representation of the first text-image pair. The vector representation of the second text-image pair may be generated using a second attention mechanism on the text modifier and applied to a respective candidate target image to generate the vector representation of the second text-image pair.

In a feature, computing the compatibility score may include inputting the vector representation of the first text-image pair and the vector representation of the second text-image pair into a compatibility neural network. The compatibility neural network may be trained to output the compatibility score based on the input.

In a feature, the first trained text-image interaction neural network may be a first TIRG neural network and the second trained text-image interaction neural network may be a second TIRG neural network.

In a feature, the first trained text-image interaction neural network may be a first MLP neural network. The second trained text-image interaction neural network may be a second MLP neural network.

In a feature, the compatibility score may be further based on third embedding of an image-image pair, where the image-image pair includes the reference image and the respective target image. The vector representation of the image-image pair may be generated using a MLP neural network.

In a feature, the method may further include obtaining the set of candidate target images by inputting the query into a cross-modal model or query-composition retrieval model to rank candidate target images stored in a database of candidate target images.

In a feature, the method may further include ranking, based on the compatibility score, the candidate target images with respect to the target image. A list of candidate target images may be displayed, the images ranked, based on the compatibility score, with respect to the target image.

In a feature, there is provided a method of training a neural network architecture to search images. The method includes generating a training batch. Generating the training batch includes obtaining a first set of triplets, each triplet, of the first set of triplets comprising a reference image, a text modifier and a target image. The target image corresponds to the reference image, modified according to the modifier. Generating the training batch further includes generating, from the first set of triplets, a second set of triplets, each triplet of the second set of triplets comprising the reference image, a text modifier, and a target image that does not correspond to the reference image modified according to the modifier. The method further includes processing all the triplets of the training batch by: randomly selecting a triplet of the training batch; inputting an encoder representation of the reference image of the selected triplet and an encoder representation of the text modifier of the selected triplet into a first text-image interaction neural network to generate a vector representation of a first text-image pair; inputting an encoder representation of the target image of the selected triplet and the encoder representation of the text modifier of the selected triplet into a second text-image interaction neural network to generate a vector representation of a second text-image pair; generating, based on the first vector representation of the first text-image pair and the vector representation of the second text-image pair, a prediction whether the triplet is obtained from the first set of triplets or the second set of triplets; and calculating, based on the prediction a loss value through a loss function. Once it is determined that there are no remaining unselected triplets in the training batch, the learnable parameters of the neural network architecture are modified according to the loss value.

In a feature, generating, from the first set of triplets, a second set of triplets, may include at least one of: randomly pairing the triplets within the first set of triplets and, for each pair of triplets, swapping the respective target images; randomly pairing the triplets within the first set of triplets and, for each pair of triplets, swapping the respective reference images; randomly pairing the triplets within the first set of triplets and, for each pair of triplets, swapping the respective text modifiers; for a randomly selected triplet within the first set of triplets, swapping respective target images with each other triplet within the first set of triplets; for a randomly selected triplet within the first set of triplets, swapping respective reference images with each other triplet within the first set of triplets; and for a randomly selected triplet within the first set of triplets, swapping respective text modifiers with each other triplet within the first set of triplets.

In a feature, generating the prediction may include computing a cosine similarity between the vector representation of the first text-image pair and the vector representation of the second text-image pair. Generating the prediction may further include computing a cosine similarity between the vector representation of the second text-image pair and the encoder representation of the text modifier. The prediction may be based on a sum of the cosine similarity between the vector representation of the first text-image pair and the vector representation of the second text-image pair and the cosine similarity between the vector representation of the second text-image pair and the encoder representation of the text modifier.

In a feature, the first text-image interaction neural network may uses a first attention mechanism on the text modifier and applied to the reference image to generate the vector representation of the first text-image pair. The second text-image interaction neural network may use a second attention mechanism on the text modifier and applied to a respective candidate target image to generate the vector representation of the second text-image pair.

In a feature, generating the prediction may include inputting, into a compatibility neural network, the vector representation of the first text-image pair and the vector representation of the second text-image pair.

In a feature, the training method may further include inputting an encoder representation of the reference image of the selected triplet and an encoder representation of the target image of the selected triplet into an image-image interaction neural network neural network to generate a vector representation of an image-image pair.

In a feature, generating the prediction may further include inputting, into the image-image representation neural network, the embedding of the image-image pair.

In a feature, there is provided a computing system including at least one processor and a computer-readable storage medium having computer-implemented instructions stored thereon, which when executed by the processor, cause the processor to perform the training methods described herein.

In a feature, a computer-readable storage medium having computer-executable instructions stored thereon is provided. When executed by one or more processors, the computer-executable instructions perform the methods described herein.

In a feature, an apparatus comprising processing circuitry is provided. The processing circuitry is configured to perform the methods described herein.

In a feature, a system for image retrieval with neural networks is described and includes: an interaction module comprising: a first text-image interaction module configured to generate a vector representation of a first text-image pair based on (a) an encoded representation of a reference image and (b) an encoded representation of a text modifier, the reference image and the text modifier received from a computing device, where the text modifier describes at least one visual difference from the reference image; and a second text-image interaction module configured to generate a vector representation of a second text-image pair based on (a) the encoded representation of the text modifier and (b) an encoded representation of a candidate target image; a compatibility module configured to compute, based on (a) the vector representation of the first text-image pair and (b) the vector representation of the second text-image pair, a compatibility score for a triplet including the reference image, the text modifier, and the candidate target image; and a ranking module configured to; rank a set of candidate target images including the candidate target image by compatibility scores of the candidate target images, respectively, of the set; and select at least one of the candidate target images from the set based on the ranks of the candidate target images, respectively; and transmit the selected at least one of the candidate target images to the computing device.

In further features, the compatibility module is configured to: compute a cosine similarity between the vector representation of the first text-image pair and the vector representation of the second text-image pair; and determine the compatibility score for the triplet based on the cosine similarity.

In further features, the compatibility module is configured to: compute a second cosine similarity between the vector representation of the second text-image pair and the encoded representation of the text modifier; and determine the compatibility score for the triplet further based on the second cosine similarity.

In further features, the compatibility module is configured to set the compatibility score for the triplet based on a sum of the cosine similarity and the second cosine similarity.

In further features: the first text-image interaction module applies a first attention mechanism on the text modifier and the reference image to generate the vector representation of the first text-image pair; and the second text-image interaction module applies a second attention mechanism on the text modifier and the candidate target image to generate the vector representation of the second text-image pair.

In further features, the compatibility module includes a compatibility neural network configured to compute the compatibility score for the triplet.

In further features: the interaction module further includes an image-image interaction module configured to generate a vector representation of an image-image pair based on the encoded representation of the reference image and the encoder representation of the candidate target image; and the compatibility module is configured to determine the compatibility score for the triplet further based on the vector representation of the image-image pair.

In further features, the interaction module is trained based on compatible triplets and incompatible triplets, where each compatible triplet includes a candidate target image that corresponds to a reference image of the respective compatible triplet modified according to a text modifier of the respective compatible triplet, and where an incompatible triplet comprises a candidate target image that does not correspond to a reference image of the respective incompatible triplet modified according to a text modifier of the respective incompatible triplet.

In further features, the ranking module is configured to rank the rank set of candidate target images including the candidate target image from highest compatibility score to lowest compatibility score.

In further features, a pre-ranking module is configured to select the set of candidate target images from a second set of candidate target images that includes more candidate target images than the set of candidate target images based on the reference image and the candidate target images of the second set of candidate target images.

In further features, the pre-ranking module is configured to select the set of candidate target images from the second set using one of a cross-modal retrieval model and a query-composition retrieval model.

In a feature, a method for image retrieval with neural networks is described and includes: generating a vector representation of a first text-image pair based on (a) an encoded representation of a reference image and (b) an encoded representation of a text modifier, the reference image and the text modifier received from a computing device, where the text modifier describes at least one visual difference from the reference image; generating a vector representation of a second text-image pair based on (a) the encoded representation of the text modifier and (b) an encoded representation of a candidate target image; computing, based on (a) the vector representation of the first text-image pair and (b) the vector representation of the second text-image pair, a compatibility score for a triplet including the reference image, the text modifier, and the candidate target image; and ranking a set of candidate target images including the candidate target image by compatibility scores of the candidate target images, respectively, of the set; selecting at least one of the candidate target images from the set based on the ranks of the candidate target images, respectively; and transmitting the selected at least one of the candidate target images to the computing device.

In further features, determining the compatibility score includes: computing a cosine similarity between the vector representation of the first text-image pair and the vector representation of the second text-image pair; and determining the compatibility score for the triplet based on the cosine similarity.

In further features, determining the compatibility score includes: computing a second cosine similarity between the vector representation of the second text-image pair and the encoded representation of the text modifier; and determining the compatibility score for the triplet further based on the second cosine similarity.

In further features, determining the compatibility score includes setting the compatibility score for the triplet based on a sum of the cosine similarity and the second cosine similarity.

In further features: generating the vector representation of the first text-image pair includes generating the vector representation of the first text-image pair by applying a first attention mechanism on the text modifier and the reference image; and generating the vector representation of the second text-image pair includes generating the vector representation of the second text-image interaction module by applying a second attention mechanism on the text modifier and the candidate target image.

In further features, determining the compatibility score includes determining the compatibility score for the triplet by a compatibility neural network.

In further features, determining the compatibility score includes: generating a vector representation of an image-image pair based on the encoded representation of the reference image and the encoder representation of the candidate target image; and determining the compatibility score for the triplet further based on the vector representation of the image-image pair.

In further features, the method further includes training to generate the vector representations based on compatible triplets and incompatible triplets, where each compatible triplet includes a candidate target image that corresponds to a reference image of the respective compatible triplet modified according to a text modifier of the respective compatible triplet, and where an incompatible triplet comprises a candidate target image that does not correspond to a reference image of the respective incompatible triplet modified according to a text modifier of the respective incompatible triplet.

In further features, the ranking includes ranking the set of candidate target images including the candidate target image from highest compatibility score to lowest compatibility score.

In further features, the method further includes selecting the set of candidate target images from a second set of candidate target images that includes more candidate target images than the set of candidate target images based on the reference image and the candidate target images of the second set of candidate target images.

In further features, selecting the set of candidate target images includes selecting the set of candidate target images from the second set using one of a cross-modal retrieval model and a query-composition retrieval model.

In a feature, a method of training a neural network to retrieve images is described and includes: generating a training dataset including: obtaining a first set of triplets, each triplet of the first set of triplets comprising a reference image, a text modifier, and a target image, corresponding to the reference image modified according to the modifier; and generating, from the first set of triplets, a second set of triplets, each triplet of the second set of triplets comprising the reference image, a text modifier, and a target image that does not correspond to the reference image modified according to the modifier; processing all the triplets of the training dataset by: selecting a triplet of the training dataset; inputting an encoder representation of the reference image of the selected triplet and an encoder representation of the text modifier of the selected triplet into a first text-image interaction neural network to generate a vector representation of a first text-image pair; inputting an encoder representation of the target image of the selected triplet and the encoder representation of the text modifier of the selected triplet into a second text-image interaction neural network to generate a vector representation of a second text-image pair; generating, based on the first vector representation of the first text-image pair and the vector representation of the second text-image pair, a prediction whether the selected triplet is obtained from the first set of triplets or the second set of triplets; and calculating, based on the prediction, a loss value using a loss function; and when all of the triplets have been processed, selectively modifying one or more learnable parameters of the neural network based on the loss value.

In further features, generating, from the first set of triplets, a second set of triplets, $<r_b, t_b, m_b>$, includes at least one of: pairing the triplets within the first set of triplets and, for each pair of triplets, swapping the respective target images; pairing the triplets within the first set of triplets and, for each pair of triplets, swapping the respective reference images; pairing the triplets within the first set of triplets and, for each pair of triplets, swapping the respective text modifiers; for a selected triplet within the first set of triplets, swapping respective target images with another other triplet within the first set of triplets; for a selected triplet within the first set of triplets, swapping respective reference images with another triplet within the first set of triplets; for a selected triplet within the first set of triplets, swapping respective text modifiers with another triplet within the first set of triplets.

In further features, generating the prediction includes computing a cosine similarity between the vector representation of the first text-image pair and the vector representation of the second text-image pair.

In further features, generating the prediction further includes computing a cosine similarity between the vector representation of the second text-image pair and the encoder representation of the text modifier, and where the prediction is based on a sum of the cosine similarity between the vector representation of the first text-image pair and the vector representation of the second text-image pair and the cosine similarity between the vector representation of the second text-image pair and the encoder representation of the text modifier.

In further features, the first text-image interaction neural network uses a first attention mechanism on the text modifier and applied to the reference image to generate the vector representation of the first text-image pair, and the second text-image interaction neural network uses a second attention mechanism on the text modifier and applied to a respective candidate target image to generate the vector representation of the second text-image pair.

In further features, generating the prediction includes, by a compatibility neural network, generating the prediction based on the vector representation of the first text-image pair and the vector representation of the second text-image pair.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Described herein are systems and methods for text-enhanced image retrieval using a neural network. For purposes of explanation, numerous examples and specific details are set forth in order to provide a thorough understanding of the described embodiments. Embodiments as defined by the claims may include some or all of the features in these examples alone or in combination with other features described below, and may further include modifications and equivalents of the features and concepts described herein. The illustrative embodiments will be described with reference to the drawings wherein like elements and structures are indicated by like reference numbers. Further, where an embodiment is a method, steps and elements of the method may be combinable in parallel or sequential execution. As far as they are not contradictory, all embodiments described below can be combined with each other.

The techniques described herein look at text-enhanced image retrieval in the framework of search problems in general: given a query q and an image dataset, G, the aim is to retrieve the subset $G_q \subset G$ of images that are relevant to q. Solving a retrieval problem requires to learn a distance function d such that, for any $g \in G_q$ and $g' \in G/G_q$, $d(q, g) < d(q, g')$. In practice, when given a query, all items of G are sorted in increasing order of distance to q.

The problem addressed herein adds two caveats to the retrieval framework. First, the query is multi-instance and multi-modal. Indeed, q=(r, m), where r is a reference image and m is a text modifier (for example, a sentence) specifying modifications to be made on r. While some retrieval problems may use object classes or categories to define relevant gallery items or matching pairs of queries and images, here ground-truth annotations include matching triplets (r, m, t), where $t \in G_{(r, m)}$ is the target image of the query (r, m). Function d handles both images (the reference image r and the target image t) for the image dataset, and fusions of image and text, for the queries. Second, both reference and target images are in the same domain, which influences the distribution of image dataset images and the semantics of the text modifiers. For example, the word "short" has different semantic meanings whether it refers to a person or to a dress, etc. It should be noted that the examples herein are described in relation to the fashion domain. However, it is to be understood, that the present application is also applicable to other environments and uses.

Figure 1:
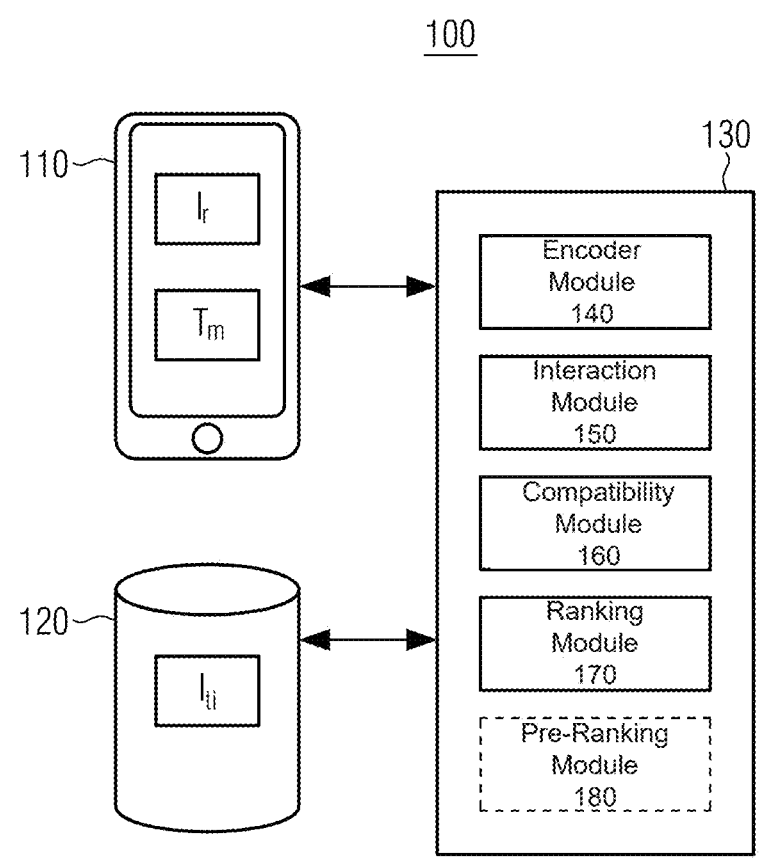
FIG. 1 illustrates a block diagram of a system for retrieving images.

FIG. 1 is a functional block diagram of an example system 100 for retrieving images in response to a user query, q. Query, q, includes a multimodal pair including a reference image, $I_r$, and a text modifier, $T_m$. Specifically, system 100 is configured to search a set of candidate target images, $I_{t_i}$ and to retrieve the candidate target image that corresponds to a target image, $I_t$, where the target image, $I_t$, corresponds to the reference image, $I_r$, modified according to the text modifier, $T_m$. In various implementations, the system 100 may retrieve the top-k of the candidate target images that most closely correspond to the reference image modified according to the text modifier where k is an integer greater than 0. The system 100 may provide the top-k candidate target images in order of rank, such as from highest rank (e.g., $1^{st}$) to lowest rank (e.g., k-th rank).

System 100 includes an input (computing) device 110, a data store 120 that stores the candidate target images, $I_t$, and a search module 130, such as having a neural network architecture. The input device 110 may include a user interface module (e.g., including a touchscreen display, a microphone, and/or one or more other suitable devices configured to receive user input) configured to receive the query, q, and to transmit the query to the neural network architecture. The input device 110 may be, for example, a smartphone, a tablet device, a laptop computer, a desktop computer, or another suitable type of computing device.

The search module 130 includes one or more trained encoder modules 140, a trained interaction module 150, a trained compatibility module 160, a ranking module 170 and, optionally, a pre-ranking module 180. The training of the one or more encoder modules 140, the interaction module 150 and the compatibility module 160 is described in detail in relation to FIG. 9 below.

The search module 130 is configured to receive the query, q, from the input device 110 and retrieve a set of candidate target images, $I_{t_i}$ based on the query and, more specifically, the reference image and the text of the query q. The set of candidate target images, $I_{t_i}$, may include all of the images stored in the data storage 120. Alternatively, the set of candidate target images, $I_{t_i}$, may include a subset (less than all) of the images stored in the data storage 120. For example, the pre-ranking module 180 may rank the images stored in the data storage 120 based on the query, q, using any suitable standard algorithm, such as a cross-modal retrieval model or a query-composition retrieval model. A predetermined number of the highest-ranking images may be output to the one or more encoder modules 140 as the set of candidate target images, $I_{t_i}$ where the predetermined number is an integer greater than zero, such as 50, 100, 200, or 500.

The reference image, $I_r$, the text modifier, $T_m$, and each of the candidate target images, $I_{t_i}$, are input into a respective one of the one or more encoder modules 140. Each of the one or more encoder modules 140 include at least one neural network for encoding the input. The encoded reference image, the encoded text modifier, and the encoded candidate target images are output to the interaction module(s) 150. The encoded reference image is denoted r, the encoded text modifier is denoted m, and the encoded candidate target images are denoted $t_i$, where the notation $\langle r, t_i, m \rangle$ is used to denote a triplet including the reference image r, a candidate target image $t_i$, and a text modifier m. The triplets are input to the encoder modules 140. For example, the reference image may be input to a first encoder module, a candidate target image may be input to a second encoder module, and the text modifier may be input to a third encoder module.

The interaction module 150 includes at least a first text-image interaction neural network and a second text image interaction neural network. The first text-image interaction neural network is trained to generate a vector representation of a first text-image pair based on the encoder representation of the reference image, r, and the encoder representation of the text modifier, m. The second text-image interaction neural network is trained to generate, for each candidate target image, $t_i$, a vector representation of a second text-image pair based on the encoder representation of the text modifier, m, and the encoder representation of a respective candidate target image, $t_i$.

In various implementations, the interaction module 150 may further include an image-image interaction neural network that is trained to generate, for each candidate target image, $t_i$, a vector representation of an image-image pair based on the encoder representation of the reference image, r, and the encoder representation of a respective candidate target image, $t_i$.

In various implementations, the interaction module 150 may further include a third text-image interaction neural network that is trained to generate, for each candidate target image, $t_i$, a vector representation of a second text-image pair based on the encoder representation of the text modifier, m, and the encoder representation of a respective candidate target image, $t_i$.

The interaction module 150 is configured to output the vector representations to the compatibility module 160. The compatibility module 160 is trained to compute a compatibility score for each triplet, <r, $t_i$, m> based on the vector representations, as is described in more detail below. The compatibility score for each triplet represents a degree to which the respective candidate target image of that triplet corresponds to the reference image modified by the text. In other words, triplets <r, $t_1$, m> are scored according to the output of the compatibility module 160 applied to the respective triplet.

The compatibility module 160 is configured to output the compatibility score for each triplet to a ranking module 170. The ranking module 170 is configured to rank each candidate target image of the retrieved set of candidate target images according to the compatibility score for the respective triplet. The ranking module 170 may rank the candidate target images, such as from highest compatibility score to lowest compatibility score.

The ranking module 170 outputs at least one candidate target image to the input device 110. For example, the candidate target image corresponding to the reference image modified by the text (i.e., having the highest compatibility score) may be transmitted to the input device 110 (e.g., via a network) for display to a user by the input device 110. Additionally or alternatively, the compatibility module 160 may be configured to rank the candidate target images with respect to the reference image modified by the text and output a list of the ranked candidate target images for display to the user by the input device.

In response to the display of at least one candidate target image on the user interface of the input device 110, the user may select one of the at least one candidate target images as a new reference image and the user may input a text modifier corresponding to the new reference image. Thus, a query may be input into the neural search module 130, where the query is based on an output of the neural network architecture. In this sense, the searching may be iterative. For example, a first query may include a first image including a striped dress and the text shorter and no stripes. In response, the search module 130 may identify a second image including a dress that is shorter yet does not have stripes. A second query may include the second image and new text, etc.

As an example, a first reference image $I_r$ input by the user may be an image obtained by the user in any suitable manner, for example transmitted by the user via the input device 110 or selected by the user on a website or other application via the input device 110. The user may also provide the modifying text via the input device 110, and the text is transmitted to the search module 130.

Subsequent to the search module 130 outputting at least one candidate target image, the user may input an image of the at least one candidate target image as a second reference image via the input device 110. The user may optionally input a second text modifier that corresponds to (and describes one or more modifications of) the second reference image. For example, the user may want to update the text modifier with respect to the output of the search module 130 for the initial query. The search module 130 then analyzes this second query and outputs a further at least one candidate target image based on the second query (including the second text and the second reference image). This process may be repeated until the user has obtained the target image that is required by the user.

Figure 2:
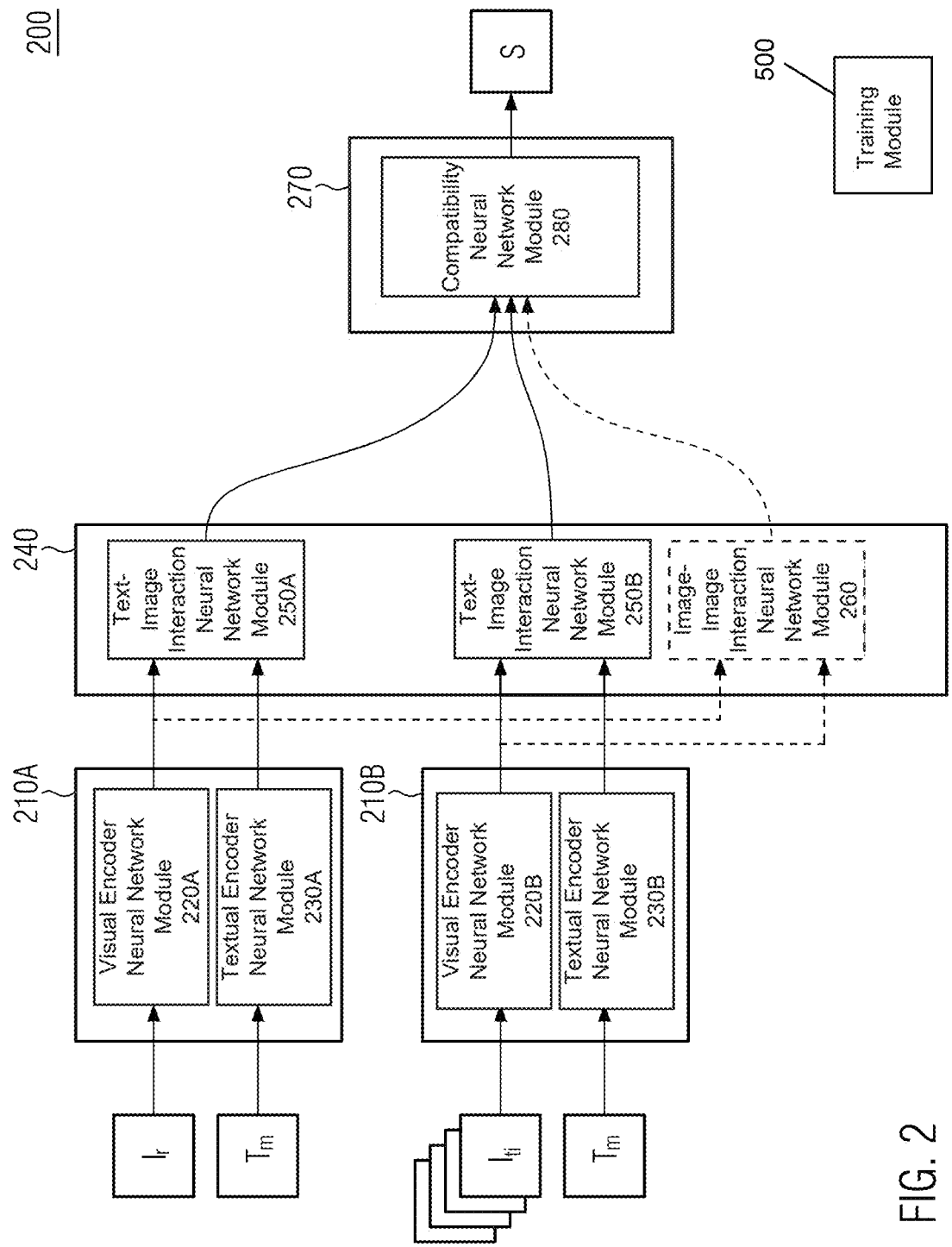
FIG. 2 illustrates a block diagram of a search module for raking images.

FIG. 2 includes an example implementation of a search module 200, such as the search module 130 described above with respect to FIG. 1. The search module 200 includes encoder modules 210A and 210B (corresponding to encoder modules 140A and 140B), interaction module 240 (corresponding to interaction module 150), and compatibility module 270 (corresponding to compatibility module 160).

The first encoder module 210A is configured to receive the reference image, $I_r$, and the text modifier, $T_m$ of a triplet. The first encoder module 210A includes a first visual encoder neural network (module) 220A trained to encode the reference image, $I_r$, and a first textual encoder neural network (module) 230A trained to encode the text modifier, $T_m$. The first encoder module 210A outputs an encoder representation of the reference image, r, and an encoder representation of the text modifier, m, to the interaction module 240 as a result of the encoding of the reference image and the text modifier.

The second encoder module 210B includes a second visual encoder neural network (module) 220B trained to encode the candidate target image, $I_{t_i}$ of a tuple, and a second textual encoder neural network (module) 230B trained to encode the text modifier, $T_m$ of the tuple. The second encoder module 210B outputs an encoder representation of the candidate target images, $t_i$, and an encoder representation of the text modifier, m, to the interaction module 240 as a result of the encoding of the candidate target image and the text modifier. It is to be understood that the first textual encoder neural network 230A and the second textual encoder neural network 230B may receive an encoder representation of the text modifier, m, from the same intermediary textual encoder. The first textual encoder neural network 230A and the second textual encoder neural network 230B may be different neural networks, as illustrated. Alternatively, the first textual encoder neural network 230A and the second textual encoder neural network 230B may be the same neural network operating with different inputs (the reference image versus the candidate target image).

The visual base encoder function of the visual encoder neural networks 220A and 220B is denoted by φ. The textual base encoder function of the textual encoder neural networks 230A and 230B is denoted by θ. $I_r=\phi(r)$, $I_t=\phi(t)$, $T_m=\theta(m)$ represent the output of the base encoders for the different elements of the triplet.

For example, the output from the last layer of a ResNet50 model (e.g., before a sigmoid function) may be used for the visual encoder function φ. This is described, for example, in He K. et al., "Deep residual learning for image recognition", Proc. CVPR, pages 770-778, 2016, which is incorporated herein in its entirety. In an example, for the textual encoder function θ, each word may be embedded to its GloVe embedding and fed to a bidirectional GRU (Bi-GRU) GloVe embedding is described in Pennington J. et al., "Glove: Global vectors for word representation", Proc EMNLP, pages 1532-1543, 2014, which is incorporated herein in its entirety. Bi-GRUs are described in Cho K. et al., "Learning phrase representations using run encoder-decoder for statistical machine translation", arXiv: 1406.1078, 2014, which is incorporated herein in its entirety. While examples are provided, the present application is also applicable to other types of encoders for the visual base encoder function and the textual base encoder function While the visual and textual encoders do not share the same output embedding space, in some examples, the visual encoders 220A and 220B and the textual encoders 230A and 230B are pre-trained for cross-modal retrieval on a training dataset of the same domain as the query, q. This enables to the visual encoders 220A-B and the textual encoders 230A-B to learn textual and visual correspondences about domain semantics. For example, if the query is in the fashion domain, the encoders may be pre-trained using a fashion dataset, such as the DeepFashion dataset.

The interaction module 240 includes a first text-image interaction neural network (module) 250A that receives as input the encoded representation of the reference image, r, and the encoded representation of the text modifier, m, respectively generated by the neural networks 220A and 230A of the first encoder module 210A. Based on the input (referred to as the first text-image pair), the first text-image interaction neural network 250A generates a vector representation (embedding) of the first text-image pair.

The interaction module 240 further includes a second text-image interaction neural network (module) 250B that receives as input the encoded representations of the candidate target images, $t_i$, (one at a time for each triplet) and the text modifier, m, generated by the neural networks 220B and 230B of the second encoder module 210B. Based on the input (referred to as the second text-image pair), the second text-image interaction neural network 250B generates a vector representation (embedding) of the second text-image pair.

The interaction module 240 may optionally further comprise an image-image interaction neural network (module) 260 that receives as input the encoded representation, r, of the reference image generated by the first encoder module 210A and the encoded representations of the candidate target images, $t_i$, generated by the second encoder module 210B. Based on the input (referred to as the image-image pair), the image-image interaction neural network 260 generates a vector representation (embedding) of the image-image pair.

In more detail, given pairs of items from the triplet <r, t, m>, at least two (or three) vectors are built corresponding to the different pairwise interactions. Let $i_{r,m}$, $i_{t,m}$, $i_{r,t} \in$ $R^D$ denote the interaction vectors and $I_{r,m}:I_r$, $T_m \rightarrow i_{r,m}$, the interaction module between r and m. $I_{t,m}$ and $I_{r,t}$ are defined symmetrically.

The text-image interaction neural networks 250A and 250B may be text-enhanced image retrieval neural networks (TIRGs). In other words, for a text-image pair, the output of a TIRG may be used as an interaction representation. The interaction function $I_{r,m}$ (symmetrically, $I_{t,m}$) can be written as:

$$I_{r,m}(I_r,T_m)=w_g f_{gate}(I_r,T_m)+w_r f_{res}(I_r,T_m) \quad (1)$$

where $f_{gate}$, $f_{res}$ are the gating and residual feature functions (e.g., equations) respectively, and $w_g$, $w_r$ are learned real-valued weights that balance the gating and residual feature functions.

$f_{gate}$ is the gating feature and is configured to retain the query image feature (in particular when the text modification is insignificant). The gating feature may be computed using following expression:

$$f_{gate}(I_r,T_m)=\sigma(W_{g2}*\text{RELU}(W_{g1}*[I_r,T_m]))\odot I_r \quad (2)$$

$f_{res}$ is the residual feature, representing the modification, and may be computed using the following expression:

$$f_{res}(I_r,T_m)=W_{r2}*\text{RELU}(W_{r1}*[I_r,T_m]) \quad (3)$$

where σ is the sigmoid function and ⊙ the element wise product. The symbol * represents a 2D convolution with batch normalization, and $W_{g1}$, $W_{g2}$, $W_{r1}$, $W_{r2}$ are 3×3 convolution filters including filter values.

In contrast to other applications of TIRG for text-enhanced retrieval, the composition of the reference image and the text encodings is not learned. Instead, TIRG is used to model each pair's intrinsic relation.

The image-image interaction neural network 260 may include a multilayer perceptron (MLP) module. For the image-image pair, the interaction $i_{r,t}$ may be modeled with a MLP over the concatenation of the base representation of each image:

$$I_{r,t}(I_r,I_t)=f_{MLP}[I_r,T_m] \quad (4)$$

where $f_{MLP}$ includes, for example, a two-layer MLP with a rectified linear unit (ReLU), dropout, and L2-normalization of the concatenated vector $[I_r, I_t]$. As described above, the image-image interaction neural network 240 is optional, and the reference-target image relation may be dropped for a more streamlined compatibility network that only depends on two interactions (the text-image pairs).

The vector representations generated by the interaction modules 250A and 250B are input into the compatibility module 270. The compatibility module 270 includes a compatibility neural network (module) 280 trained to compute and output a compatibility score for each candidate target image, $I_{t_i}$ based on the vector representations. The compatibility score (value) indicates whether a given candidate target image is a match for the target image or not. In other words the compatibility score for a candidate target image corresponds to how closely the candidate target image achieves the reference image as modified by the text.

In some embodiments, the compatibility module 270 may include an MLP module, such as: the different inputs (embeddings) received from the interaction modules are concatenated, then the generated vector is L2-normalized before being used as input of two fully connected layers, followed by one or more ReLU activations. A last fully connected layer then outputs a single value, (e.g., forced to lie between 0 and 1 by a sigmoid function). In various implementations, dropout may be applied on the compatibility module 270.

More formally, let C: $i_{r,m1}, i_{t,m2}, i_{r,t} \to c_{r,m1,t,m2} \in [0, 1]$ be the function computing the compatibility score from the interactions $i_{r,m1}, i_{t,m2}, i_{r,t}$. In the case where $m_1=m_2=m$, $c_{r,m1,t,m2}$ is noted $c_{r,t,m}$ and, by extension, stands for the compatibility score of the triplet elements r, t, m, computed through the interactions $i_{r,m}, i_{t,m}, i_{r,t}$ between the elements. A compatibility score of 1 may mean that the elements of the triplet are compatible (the candidate target image matches the reference image when modified by the text), whereas a compatibility score of 0 means that they are not (the candidate target image does not match the reference image modified by the text). Somewhat, the compatibility score represents a probability that the considered elements are compatible. As will be described below, for training, incorrect combinations of elements (candidate target images that do not match a reference image modified by given text) are built from elements belonging to different annotation triplets. Hence the distinction between $m_1$ and $m_2$ in the above formalization.

For training the neural networks of the interaction module 240 and the compatibility module 270, the most natural loss to learn to label a triplet as compatible (1) or incompatible (0) may be a binary cross-entropy loss. However, different kinds of loss can be used depending on the mining of incorrect combinations within each mini-batch:

BCE-TDC: is a binary cross-entropy loss on target-dissident combinations, with mean reduction.

B is the batch size. $k \in [0, B-1]$ indexes a triplet. $\hat{k} \in [1, B-1]$, $\hat{k} \neq k$ comes from an index shift performed within the batch to pair two annotation triplets and therefore create target-dissident combinations (TDCs). An expression of the BCE is:

$$L = \frac{-1}{B}\sum_{k=0}^{B-1} y_n \log(x_n) + (1-y_n)\log(1-x_n).$$

For each element k of the batch, a single triplet pairing is considered (i.e., the triplet k is paired only once to another triplet $\hat{k}$), and only target-dissident combinations are resorted to. Hence, there is one term $(x_n, y_n)$ for $c_{r_k,t_k,m_k}$ and another term $(x'_n, y'_n)$ for $$c_{r_k,t_{\hat{k}},m_k}.$$

Since the expected value for $c_{r_k, t_k, m_k}$ (resp.

$$c_{r_k,t_{\hat{k}},m_k})$$

is 1 (resp 0), the expression of the loss becomes:

$$BCE - TDC = \frac{-1}{B}\sum_{k=0}^{B-1} y_n \log\left(c_{r_k,t_k,m_k}\right) + \log\left(1 - c_{r_k,t_{\hat{k}},m_k}\right) \quad (5)$$

MultipleBCE may refer to BCE using multiple incorrect combinations arising from a same and single triplet pairing. Recall that $c_{r_k t_k m_k} = c_{r_k m_k t_k m_k}$. Therefore multipleBCE can be expressed as:

$$multipleBCE = \frac{-1}{B}\sum_{k=0}^{B-1} \log\left(c_{r_k,t_k,m_k}\right) + \quad (6)$$

$$\log\left(1 - c_{r_k,t_{\hat{k}},m_k}\right) + \log\left(1 - c_{r_k,t_{\hat{k}},m_k}\right) + \log\left(1 - c_{r_k,t_{\hat{k}},m_k}\right) +$$

$$\log\left(1 - c_{r_k,m_k,t_k,m_{\hat{k}}}\right) + \log\left(1 - c_{r_k,m_{\hat{k}},t_k,m_k}\right)$$

For a given triplet pairing, there can be up to 14 incorrect combinations, including two target-dissident combinations because of the symmetry in k and J (since $\hat{k}$ simply represents another triplet). Note that only a few triplets contribute to the loss in this example.

MultipleBCE-TDC may involve BCE using multiple target-dissident combinations (TDCs) arising from different pairings between triplet k and other triplets from the batch. Let $\hat{K}_k = \{\hat{k} \in [1, B-1], \hat{k} \neq k, \text{all } \hat{k} \text{ being distincts}\}$ be issued from different index shifts, and representing the different triplet pairings that are considered. Hence:

$$multiple\ BCE - TDC = \quad (7)$$

$$\frac{-1}{B}\sum_{k=0}^{B-1} \log\left(c_{r_k,t_k,m_k}\right) + \sum_{\hat{k}\in\hat{K}_k} \log\left(1 - c_{r_k,t_{\hat{k}},m_k}\right)$$

ReweightedBCE may refer to, for multipleBCE or multipleBCE-TDC, reweighting the positive term (corresponding to the correct combination) such that it is given as much credentials as the negative term (where contributions from multiple incorrect combinations are added up). Hence the reweighted version of multipleBCE-TDC can be expressed as:

$$multiple\ BCE - TDC_{rew} = \quad (8)$$

$$\frac{-1}{B}\sum_{k=0}^{B-1} \text{card}(\hat{K}_k) \log\left(c_{r_k,t_k,m_k}\right) + \sum_{\hat{k}\in\hat{K}_k} \log\left(1 - c_{r_k,t_{\hat{k}},m_k}\right)$$

The encoder neural networks 220A-B and 230A-B may be pre-trained using cross-modal retrieval prior to training the neural networks of the first interaction module 250a, the second interaction module 250B and the compatibility module 280. The pre-trained weights of the encoder neural networks 220A-B and 230A-B may be initially kept frozen (constant), so as to train the neural networks of the interaction module 240 and the compatibility module 270. The encoder neural networks 220A-B and 230A-B may be trained after the training of the interaction module 240 and the compatibility module 270.

Experimental Validation

The Fashion IQ dataset. The fashion IQ dataset links in-shop images of fashion clothing items through relative captions in natural language. Images are classified in three fashion categories: women's tops ("toptee"), women's dresses ("dress"), and men's shirts ("shirt"). Annotations include lists of triplets and lists of images for each split and fashion category, where a triplet includes a reference image, $I_r$, a text modifier (or "relative caption"), m, and a target image, $I_t$. The text modifier, m, includes two short sentences (coming from two different annotators, such as humans), describing the visual difference between a reference image, $I_r$, and a target image, $I_t$. The query, q, is formed of both the reference image, $I_r$, and the text, m, specifying the modifications.

Submissions to the Fashion IQ challenge are ranked according to their performance on a challenge metric (CM), which is evaluated with recall metrics. The mean between Recall@10 and Recall@50 is computed for each element, within its corresponding fashion category. Recall@K includes looking at the top K candidate target images that generated the K highest compatibility scores with the query. The overall performance is measured by taking the average over the fashion categories, of the mean over all the queries for each fashion category independently. Formally, this can be expressed as:

$$CM = \frac{1}{3} \sum_{fc \in FC} \sum_{q \in Q_{fc}} \frac{R_q@10 + R_q@50}{2}$$

with FC being the set of fashion categories, $Q_{fc}$ the set of queries within the fashion category $f_c$, and $R_q@10$ (resp. $R_q@50$) the Recall@10 (resp. Recall@50) for the query q. Since the labels are not yet publicly released for the test set, evaluations are carried out on the validation set.

Experiments

Regarding pre-processing, images may be encoded in the RGB (red green blue) space, and resized to fit predetermined network input requirements, before being normalized. Image data may be augmented throughout batches using random horizontal flip (human clothes being generally symmetrical with regard to the vertical axis) and random crop, with a size scale lying in a predetermined range (e.g., 70% and 100%) of the original image size. A more severe cropping may impact performance. This may be because the cropping implied leaving out important information often mentioned in the caption (about sleeves, neck, etc.).

Text modifiers may be converted to lower case, and pre-processed to remove any special characters (such as "I"). One or more other natural language processing techniques may also be applied to the text to improve training, such as spelling correction and lemmatization (to reduce both the out-of-vocabulary word rate and the word variability).

As stated above, each text modifier includes two sentences. Textual augmentation may be performed by randomly inverting the two sentences, separated by a "<and>" special token, or by randomly choosing only one of them.

The vocabulary is built from the training text modifiers, and enriched by the fashion attributes and categories used in the DeepFashion dataset, to provide a more exhaustive fashion knowledge for further training and inference.

Several experiments are carried out for different model configurations, different weight initialization, and different losses. The configuration in which the interaction module 150 includes the first text-image interaction neural network 230A and the second text-image interaction neural network 230B (without the image-image interaction neural network 240) is referred to as a baseline configuration.

A declination of the model includes using the same interaction network for $I_{r,m}$ and $I_{t,m}$ with a modification where the TIRG residual is added up to the gated feature in $I_{r,m}$, it is subtracted in $I_{t,m}$. The motivation behind this operation is multiple as follows. Since the weights are shared between the two text-image interaction neural networks, the loss has a stronger effect when being backpropagated. There is twice more information output that is relevant for the loss computation. Therefore, the loss carries back twice more information to the same weights. Using a single network to compute the two textual-related interactions (either with the reference image or with the target image) enables the compatibility module to focus solely on computing the compatibility of these interactions instead of having to convert them both into the same space beforehand. This therefore avoids having two different text-image interaction neural networks that diverge. The use of a single network induces a kind of correlation between the two interaction vectors, roughly making up for the image-image interaction that is missing in this configuration.

As described above, the interaction between the reference image and the target image can also be directly taken into account by the network 260.

Experiments were carried out with the image encoders having the same architecture and weights as the modified ResNet50 from the MMFashion toolbox pretrained for attribute prediction. The image and text feature extractors are initialized with the weights of a query-composition model finetuned on the FashionIQ dataset.

The training is performed with a batch size of 32 and a learning rate of 0.0002. Each configuration is trained for 10 epochs, but since improvement is shown until the last epoch, a longer training should achieve even better results.

Table 1 below shows quantitative results for the different configurations of the model, different weight initializations, and different training losses, on a subset of the validation set including the 500 first annotations of each fashion category.
Results per fashion category $$\left(\frac{R@10 + R@50}{2}\right)$$

are shown on a subset of 1500 triplets extracted from the validation set of Fashion IQ, for different configurations of the model. The configurations used are specified for each comparison block. Initializing encoders weights from the MMFashion model pretrained on the attribution prediction task with DeepFashion is indicated by "AttrPrednet enc. pretraining". Initializing encoders weights from a pretrained model using query-composition for target retrieval was used. The best result within each comparison block regarding the (light) challenge metric is highlighted in bold font. The result of the best found configuration is underlined.

TABLE 1

| Model | Shirt | Toptee | Dress | Average |
|---|---|---|---|---|
| Config: AttrPred-net enc. pretraining | | | | |
| no training | 6.30 | 5.90 | 5.30 | 5.83 |
| BCE-TDC | 17.00 | 22.80 | 17.70 | 19.17 |
| multipleBCE | 14.40 | 19.60 | 15.80 | 16.60 |
| multiple BCE-TDC | 22.90 | 26.20 | 20.40 | 23.17 |
| multipleBCE-TDC reweighted | 20.40 | 24.70 | 18.40 | 21.17 |
| Config: Attrpred-net enc. pretraining, BCE-TDC | | | | |
| w/o shared TIRG | 17.00 | 22.80 | 17.70 | 19.17 |
| w/ shared TIRG | 15.50 | 21.70 | 15.50 | 17.57 |
| Config: multipleBCE-TDC | | | | |
| AttrPred-net enc. pretraining | 22.90 | 26.20 | 20.40 | 23.17 |
| Query-Comp-Retr. enc. pretraining | 58.10 | 67.90 | 56.80 | 60.93 |
| Config: Query-comp-Retr. enc. pretraining, multiple BCE-TDC | | | | |
| w/o image interaction | 58.10 | 67.90 | 56.80 | 60.93 |
| w/ image interaction | 64.40 | 74.00 | 59.40 | 65.93 |
| Config: Query-Comp-Retr. enc. pretraining, multiple BCE-TDC, w/ image interaction | | | | |
| w/ encoder finetuning | 68.00 | 76.80 | 65.10 | <u>69.97</u> |

From these results, observations are as follows. Using the BCE-TDC loss may be better than using multipleBCE, which considers other incorrect combinations for a given triplet pairing. BCE-TDC performing better than multipleBCE could come from the fact that the additional incorrect combinations (e.g., when swapping the modifying text in the interactions) are less meaningful and straightforward than target-dissident combinations (when swapping only the target image in the interactions). The problem is to find the right corresponding target image. The multipleBCE-TDC loss leads to a most efficient training, so using several target-dissident combinations during training improve the network's ability to discriminate between compatible and incompatible triplets.

The model benefits from the image-image interaction module 260, especially for shirt and toptees.

Figure 3:
FIG. 3 illustrates images retrieved for a given query by the search module of FIG. 2.

Qualitative results, obtained with the best model configuration, are presented in FIG. 3 and compared to some results produced by a query-composition model, trained to retrieve the target image from the fusion of the query elements (using TIRG). Retrieved images for a given query within the validation set of Fashion IQ, using the query-composition model are illustrated in the odd rows and the relationship compatibility method in the even rows.

The relationship compatibility method manages to dynamically leverage the interaction vectors depending on available interaction information. The first few rows in FIG. 3 suggest that the relationship compatibility method knows better how to attend the reference image, since the proposed items globally share the ethereal aspect of the reference dress, as well as its shape (short in the front, long in the back). Similarly in the next couple of rows, while being asked a dress of different color, the query-composition model output clothes of similar tint whereas the relationship compatibility system shows a more exploratory spirit.

The compatibility module 270 has direct access to the interactions of each element with the others, and may therefore resort to information coming from one or the other interaction vector, depending on the strength of the other interactions. For instance, if the reference image is really useless, the compatibility module 270 might recourse more importantly to the text in order to decide of the compatibility score. This is illustrated by the last two rows of FIG. 3.

Figure 4:
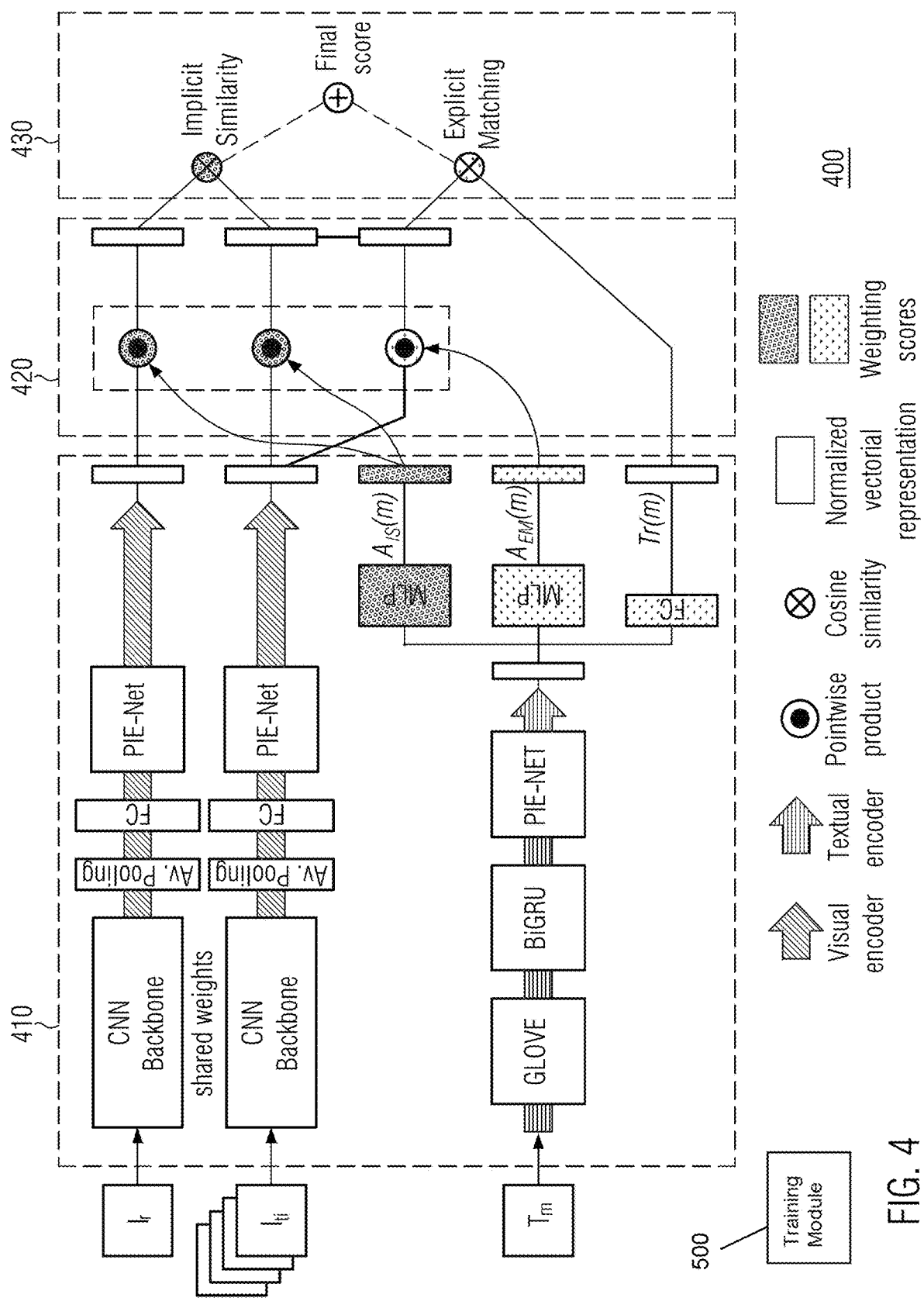
FIG. 4 illustrates a block diagram of a search module for ranking images.

FIG. 4 is a functional block diagram of an example search module 400. The search module 400 corresponds to the search module 130 described above with respect to FIG. 1 and includes encoder module 410 (corresponding to encoder module 140), interaction module 420 (corresponding to interaction module 150), and a compatibility module 430 (corresponding to compatibility module 160).

The encoder module 410 includes a first visual encoder neural network (module) that encodes the reference image, $I_r$, and a second visual encoder neural network (module) that encodes each of the candidate target images, $I_{t_i}$. The reference image, $I_r$, and the candidate target images, $I_{t_i}$, input into the encoder module 410 are processed in a similar manner. In various implementations, the first and the second visual encoder neural networks may be the same neural network. In various implementations, the reference image, $I_r$, and the candidate target images, $I_{t_i}$, may be encoded using a convolutional neural network (CNN) followed by a PIE-Net neural network, such as described in Song and Soleymani, Polysemous Visual-Semantic Embedding for Cross-Modal Retrieval, CVPR 2019, which is incorporated herein in its entirety. For a given input image, local visual features may be extracted from the last convolutional layer of the CNN, as well as global visual features based on the output of the same CNN, where local features have been average-pooled and fed to a fully connected layer. The PIE-Net module applies self-attention to the local features and fuses them with the global features via a residual connection. Letting $\phi(\cdot)$ be the visual encoders, the resulting L2-normalized features of the reference image and the candidate target images may be respectively denoted as $r=\phi(I_r)\in\mathbb{R}^{H_I}$, $t=\phi(I_t)\in\mathbb{R}^{H_I}$. While the example of the CNN followed by a PIE-Net module is provided, the present application is also applicable to the neural networks of the encoder module 410 being another suitable type of encoder.

The encoder module 410 further includes a textual encoder neural network (module) for encoding the text modifier, $T_m$. The text modifier may be first tokenized into word embeddings and the word embeddings may be concatenated to produce local textual features. In some embodiments, a Bi-GRU may be used on top of these word embeddings and may produce a global textual feature. Another PIE-Net module, taking the local and the global features as input, may return a final text embedding. Letting $\theta(\cdot)$ denote the textual encoder, the resulting L2-normalized features of the text modifier m may be denoted as $m=\theta(T_m)\in\mathbb{R}^{H_T}$.

The interaction module 420 is configured to receive the encoded representations of the reference image, r, the text modifier, m, and the candidate target images, $t_i$. The interaction module 420 includes a trained first text-image interaction neural network (module) that receives as input the encoded representation of the reference image, r, and the text modifier, m. The first text-image interaction neural network uses a first attention mechanism on the text modifier and applied to the reference image to generate the vector representation of the first text-image pair based on the input. The interaction module 420 further includes a trained second text-image interaction neural network (module) that receives as input the encoded representation of each of the candidate target images, $t_i$, and the text modifier, m. The second text-image interaction neural network uses a second attention mechanism on the text modifier and applied to the respective candidate target image to generate the vector representation of the second text-image pair based on the input.

The compatibility module 430 is configured to receive, as input, the vector representation of the first text-image pair and the vector representation of the second text-image pair from the interaction module 420. Based on the input (the vector representations), the compatibility module 430 computes an implicit similarity (IS) score (value). In embodiments where the interaction module comprises only the first text-image interaction neural network and the second text-image interaction neural network, the implicit similarity score is the compatibility score.

The implicit similarity score focuses on the similarities between the reference image and the target image. This is similar to a visual search setting, which compares two image representations together. A difference lies in the role played by the text modifier. Here, the two images (the reference image and the respective candidate target image) should be similar according to the concepts that are not mentioned in the text modifier, since the text modifier describes the differences between them, and hence takes their common points into account. The text modifier comes in to soften the visual searching, since it holds part of the information about how the candidate target image should differ from the reference image. This is done thanks to a second attention mechanism which uses the textual modifier to reweigh the visual (vector) representations.

The textual features of the text modifier, m, are used as a guide to compare the target image to the reference image. An attention mechanism $A_{IS}(\cdot)\mathbb{R}^{H_T}\to[0,1]^{H_l}$, taking m as input, predicts the importance of the dimensions in the target and the reference descriptors for their comparison. The implicit similarity score may be computed as follows:

$$s_{IS}(r,m,t)=\langle A_{IS}(m)\odot r|A_{IS}(m)\odot t\rangle \qquad (9).$$

In various implementations, the interaction module may optionally further include a third trained text-image interaction neural network (module) that receives as input the encoded representations of the candidate target images, $t_i$, respectively, and the text modifier, m. The third text-image interaction neural network uses a third attention mechanism on the text modifier and applied to the respective candidate target image to generate the vector representation of the third text-image pair based on the input.

The compatibility module 430 may be further configured to receive, as input, the vector representation of the third text-image pair from the interaction module 420. Based on the input, the compatibility module 430 computes an explicit matching (EM) score (value). The compatibility score may be set based on or equal to a sum of the implicit similarity score and the explicit matching score (i., implicit similarity score+explicit matching score).

The explicit matching score measures how well the candidate target image and the text modifier match. A priori, removing the reference image from the query may not yield satisfactory retrieval results. First, most text modifiers should be contextualized by the reference image, and act as a comparison or relative caption between the two images (reference image and candidate target image). This is, for example, the rationale behind composition learning for this studied task. Second, the candidate target image should share characteristics with the reference image that are not present in the text modifier, so the textual part of the query is only a partial caption for the candidate target image describing only the parts of the reference image that are desired to be changed.

However, a semantic analysis on the FashionIQ dataset shows that, for about half of the queries, when the paired images are visually distinct, the text modifier does not relate to the reference image and instead directly describes the target image. This observation still holds for the Shoes dataset. Thus, the reference image is ignored for this first aspect of the problem and explicit matching only focuses on finding a target image that meets the requirements of the relative caption.

Thus, in various implementations, the search module 130 may compute the explicit matching score only such that the compatibility score is the explicit matching score. Note that this bears resemblance to, but still differs from, caption-to-image cross-modal retrieval. On top of producing better results, as will be presented below, explicit matching is trained jointly with the implicit similarity score described above, and, more importantly, the text modifier also takes part in an attention mechanism applied to both the reference image and the candidate target image.

The representation of the candidate target image t, is altered to be matched with the representation of the text modifier, m, based on m itself. The dimensions of t, describing concepts that are not mentioned in m are filtered out, to avoid considering non-related visual information for matching. This is done using an attention mechanism, $A_{EM}(\cdot)$: $\mathbb{R}^{H_T}\to[0,1]^{H_l}$, which re-weights the dimensions of the image embedding based on m.

To compare the attended representation of the target image with the embedding of the relative caption, which belongs to a different modality, m is first projected into the visual space using a learned transformation $Tr(\cdot):\mathbb{R}^{H_T}\to\mathbb{R}^{H_l}$. This relieves the attention mechanism $A_{EM}$ from the conversion task and allows the attention mechanism to focus on using m for filtering only.

The explicit matching score may be computed as using:

$$s_{EM}(m,t)=\langle Tr(m)|A_{EM}(m)\odot t\rangle \qquad (10),$$

where $\odot$ is the pointwise product and $\langle .|.\rangle$ represents cosine similarity (the two terms are L2-normalized). $Tr(\cdot)$ includes a fully connected layer, and $A_{EM}(\cdot)$ is a two-layer MLP module separated by a ReLU activation, and followed by a softmax operation.

The attention mechanisms $A_{EM}(\cdot)$ and $A_{IS}(\cdot)$ may have the same architecture but different weights because their use of the text modifier, m, is different. The attention mechanism $A_{EM}(\cdot)$ guides according to its input while the attention mechanism $A_{IS}(\cdot)$ guides according to the complement of its input.

Thus, the search module 400 involves efficient attention mechanisms and decomposes the problem (the query) in two complementary views. The first view involves the similarities between the reference and candidate target images. The properties that should be shared between the two images are implicit to their visual information. As similarities, they are not differences, and thus, are not explicitly mentioned by the textual modifier. Consequently, in the implicit similarity score, the text modifier is used as a way to select the visual cues that should be similar between the reference image and the candidate target images (e.g., implicit matching score increases as the candidate target image is more similar to the reference target image and vice versa in non-modified characteristics). The first view accounts for the importance of the textual cue. The explicit matching score poses the text modifier as a relative caption to perform retrieval, and ignores the reference image. The explicit matching score specifically looks for details in the candidate target image that are explicitly mentioned in the text modifier using an attention mechanism (explicit matching score increases as the candidate target image satisfies the text modifier and vice versa). Finally, these two complimentary views (the implicit and explicit matching scores) may be unified into a single score for joint training.

The text modifier plays multiple roles in the model. On the one hand, it is used as a simple yet efficient attention mechanism, where the textual embedding is transformed into sets of weighing scores which can be applied to the visual representations of the reference image and the target image, in both parts of the model. Simultaneously, it is used as a query in its own right for explicit matching.

The neural networks of the search module 400 may be trained using the bidirectional triplet loss. Given a batch of training data $D=\{(I_{r_i}, T_{m_i}, I_{t_i})\}_{i=1}^{B}$ where $I_{t_i}$ corresponds to the unique annotated correct target for the query $((I_{r_i}, T_{m_i}))$, the model is trained using a bidirectional triplet loss, such as described in A. et al., Devise: A deep visual-semantic embedding model, Proc. NeurIPS, 2013, which is incorporated by reference in its entirety and is described by:

$$L_{tpl}=\frac{1}{B}\sum_{i=1}^{B}\sum_{d\in\{1,2\}}\frac{1}{|N_i^d|}\sum_{j\in N_i^d}l^d(i,j)$$

where $N_i^d$ represents the set of considered negatives examples for the query indexed by i and the direction d, and $l^d(i,j)$ is given by $$\begin{cases} l^1(i, j) = [\alpha - s(r_i, m_i, t_i) + s(r_i, m_i, t_j)]_+; \\ l^2(i, j) = [\alpha - s(r_i, m_i, t_i) + s(r_j, m_j, t_i)]_+, \end{cases}$$

with $s(r_i, m_i, t_i) = s_{EM}(m_j, t_k) + s_{IS}(r_i, m_i, t_k)$ for any $(i, j, k) \in [1, B]^3$, $[x]_+ = \max(x, 0)$ and $\alpha$ is the margin.

This makes the query and the target two pivots of the training. At the same time, the bidirectional loss tries to push the target closer to its corresponding query, and away from non-matching queries, while proceeding likewise from the query perspective. Next, the choice of the set of negatives $N_i^d$ for $d \in \{1, 2\}$ and a given triplet i is described.

Negative mining is performed within each batch for the sake of computational costs, and is organized in two parts. First, the relative violation step includes ignoring a hardest negative in order to learn from hard-moderate negatives (e.g., empirically chosen as the B=2 most difficult negatives after the B=10 hardest). Second, the maximum-violation uses the hardest negative of each query in a mini-batch. The reason behind the two-stage negative mining is threefold.

Primarily, the model needs to learn the semantic correspondences between the visual and the textual descriptors. Thus, at this stage, it is important to feed enough negatives to the model for it to learn diverse visual-semantic correspondences: using only the hardest negative would not be enough. At the same time, progressively dropping the easiest negatives in the course of this first training stage would account for the improvement of the model and enables to focus the training signal on the most informative negative examples. As a trade-off, half the number of available negatives for the whole step are used, that is called relative violation step.

Secondarily, both the visual base encoder and the word level text encoder are pre-trained on a general domain, so they are pre-trained to properly encode some relevant information. The rest of the multi-modal model may be initialized randomly. Hence, a warm-up may be applied only to the PIE-Nets, the EM, and the IS modules. However, because of a large domain gap between the general domain and the targeted use domain (e.g., the fashion domain), the representations of the visual and textual elements may not be adapted to encode subtle domain-specific details and discriminate two very similar items. Consequently, the hardest negatives which may constitute noisy information in the first training stage are removed. While the warmup phase may not need to be aligned with the relative-violation step, the two are fused in one stage/phase/step to avoid the multiplication of training stages.

Once the model is trained to deal with basic semantic correspondences between the visual and the textual descriptors, the base encoders are fined-tune trained on the targeted use domain (e.g., the fashion domain) to produce more meaningful and discriminative features. From that point the hardest negatives can be taken advantage of. This may be referred to as the maximum-violation training step.

Generally speaking, this two-stage optimization/training strategy acts as a form of curriculum learning to guide the model through a more stable training. Better performance is observed when leveraging negatives and performing training in this order.

Experiments

Two datasets linking pairs of in-shop images using relative captions in natural language are considered the Fashion IQ dataset and the Shoes Dataset. The Fashion IQ dataset includes 46.6 k training images and around 15.5 k images for both the test and validation splits. There are 18 k training queries, and 6 k queries per evaluation split. The text modifier $T_m$ includes two relative captions produced by two different human annotators, exposed to the same reference-target pair $I_r$, $I_t$. Three article categories are considered, women's tops (toptee), women's dresses (dress) and men's shirts (shirt).

The Shoes dataset is extracted from the Attribute Discovery Dataset and includes 10 k training images for 9 k training triplets, and 4.7 k test images for 1.7 k test queries. Here, $T_m$ represents only one sentence.

Evaluation

The Recall@K (R@K) is reported, which is the percentage of queries for which the correct ground truth item is ranked among the top K retrieved items. All reported numbers are obtained as an average of 3 runs.

For the FashionIQ dataset, the standard evaluation metric is the one used for the companion challenge. It computes the R@10 and R@50 for each of the 3 fashion categories and averages these six results.

Since the test split annotations of the FashionIQ dataset became available only very recently, previous works only report results on the validation set, and resort to ad hoc strategies to set their hyper-parameters and early-stop criteria. In order to compare the method described herein with other approaches, results are provided on both the test and validation subsets. Equipped with both split annotations, a bidirectional cross-validation is performed between them: experiments were run for a fixed number of 24 epochs and, at the end of each epoch, the model was evaluated on both sets. The best performing model at validation was selected to report results on the test set and vice-versa.

For the Shoes dataset, a method addressing the task on this dataset: R@1, R@10 and R@50 are reported for all experiments.

Implementation Details 300-dimensional GloVe word embeddings may be used as local textual features. Unless explicitly stated, all the experiments described below employ a ResNet50 architecture pretrained on the ImageNet dataset.

To maintain the aspect ratio and avoid losing information about the top and the bottom of the clothing items, images are first padded with white pixels to obtain a square. They are then resized to 256×256 pixels and augmented using random horizontal flip and a random crop of size of 224×224 pixels. Captions are preprocessed to replace special characters by spaces and to remove all other characters than letters. Spelling correction and lemmatization may not improve the results.

To train the model with more relevant negative samples, the training batches are constructed to be category-specific when dealing with the FashionIQ dataset: batches are populated with samples from a single category at a time, and categories are alternated between as new batches are built. The effectiveness of this decision is demonstrated in the ablation studies shown in Table 3.

During training, the maximum number of epochs is set to a predetermined value, such as 24. The base encoders are frozen during the first 8 epochs to pretrain the PIENets, and the explicit matching and implicit similarity modules. These epochs correspond to the relative-violation stage. In the last 16 epochs, the neural network model is trained end-to-end with maximum violation. The network is trained using the Adam optimization, a batch size of 32 and an initial learning rate of $5 \times 10^{-4}$ with a decay of 0.5 every 5 epochs, then every 3 epochs after the first 16 epochs. The margin is set to $\alpha = 0.1$, and the dimension of both the image and textual embeddings to $H_I = H_I = 512$.

Ablation Study

An ablative study was conducted on the FashionIQ dataset, to evaluate the influence of several design choices in the search module 400. In this study, for simplicity, the average R@50 over fashion categories and the median rank is reported. All results discussed in this section are presented in Table 3. The ablation studies are separated into two parts: first different choices of the modules, and then several options for the optimization.

Table 2 shows the results of an ablative study of the different components of the method described herein with a ResNet50 backbone on the validation and the test split of FashionIQ. When not specified, results are provided using the two-stage negative mining with the presented triplet loss, batch specification, and the two scores explicit matching (EM) and implicit similarity (IS). The R@50 and the median rank (m. rank) of the correct target are reported.

TABLE 2

| Type of modules | Validation split | | Test split | |
|---|---|---|---|---|
| | R@50 | m. rank | R@50 | m. rank |
| Independent modules | | | | |
| IS module only | 11.27 | 705 | 10.64 | 677 |
| EM module only | 31.54 | 138 | 31.69 | 143 |
| TIRG Module | | | | |
| Trained with triplet loss | 37.48 | 103 | 37.17 | 102 |
| Trained with BBC loss | 41.85 | 82 | 41.84 | 82 |
| EM + IS Modules | | | | |
| Trained with BBC loss | 46.62 | 62 | 47.47 | 61 |
| max. violation only | 3.81 | 1646 | 3.53 | 1653 |
| rel. violation only | 42.45 | 76 | 42.13 | 78 |
| without batch specif. | 48.26 | 58 | 47.55 | 59 |
| Full neural network model | 49.85 | 54 | 48.59 | 55 |

The approach when using either explicit matching or implicit similarity as the only scoring module is compared. The explicit-matching-only model performs well, despite not including the reference image in the query. What is to be preserved from the reference image (implicit similarity) remains ambiguous whereas the relative caption often describes directly the target image (explicit matching). These results outline the reliability of the text modifier. The performance of the explicit-matching-only model shows the effectiveness of the pseudo cross-modal retrieval strategy as a proxy to the fashion article retrieval problem.

As an alternative, TIRG, described in Vo N. et al., Composing text and image for image retrieval—an empirical odyssey, Proc CVPR, pages 6439-6448, 2019, which is incorporated herein in its entirety, is also implemented as a baseline module, since it is a composition module used amongst FashionIQ challenge participants. While it can be trained with the same triplet loss described herein, the most successful TIRG-based models are trained with a batch-based classification (BBC) loss. Using the same notations as before, the BBC loss can be computed as:

$$L_{BBC} = \frac{-1}{B} \sum_{i=1}^{B} \log \frac{\exp\{\gamma s(r_i, m_i, t_i)\}}{\sum_j \exp\{\gamma s(r_i, m_i, t_j)\}}$$

where $\gamma$ is a trainable weight empirically initialized to 10, which improves convergence.

Table 2 presents results for TIRG modules trained either with the triplet or the BBC loss, as well as results with the configuration of explicit matching and implicit similarity trained with the BBC loss. While the BBC loss improves the results of the TIRG module, it may not improve the training of the model disclosed herein. Despite performing better than each module separately, TIRG is outperformed by the full pipeline, which combines the explicit matching module and implicit similarity module. Notice that explicit matching and implicit similarity are much simpler modules that work in tandem, and have a similar complexity to the full TIRG module when combined. Table 2 highlights the synergy between explicit matching and implicit similarity, supporting the motivations extensively discussed above.

Regarding optimization, three experiments were performed: training only with maximum violation, training only with relative violation, and training without batch specification. The experiment with only maximum-violating triplets may fail to deliver satisfactory results. The use of hardest negatives may not be effective immediately, and the network may benefit from first being warmed up. The network may not be able to robustly learn visual-linguistic correspondences with such a low amount of triplet interactions.

The experiment with relative-violation gives good results, outperforming TIRG models, but is still 8% points behind the training proposed herein. The hardest negatives carry important information to discriminate ambiguous fashion items once the network works on average training examples. This enables to go beyond the performance plateau reached by the first training stage.

The experiment without batch specification shows that this strategy has a small but visible impact on the results for both FashionIQ splits.

Comparison

The approach discussed herein is compared with baselines and other approaches on the two datasets.

The embedding of the textual modifier is used to retrieve the target image. The training pipeline is the same as the neural network of FIG. 4, however s(r, m, t)=<m|t> is used for training and scoring instead of s(r, m, t)=$s_{EM}$(m, t)+$s_{IS}$(r, m, t). The study of this baseline is motivated by the fact that in 49% of the cases, the (not so relative) caption describes exclusively the target according to a semantic analysis. This is equally observed for the Shoes dataset.

It is based on the intuition that the text modifier adds and/or removes information from the reference image to get to the target image. Similarly, the explicit matching score plus the implicit similarity score is replaced by s(r, m, t)=<r+m|t>. TIRG may be used as a baseline.

Results are reported in Tables 3A and 3B for the validation split of FashionIQ and Tables 4A and 4B for the test split. The Challenge metric and individual R@K scores are provided for the 3 categories. † means an implementation of the TIRG model described by Vo N. et al and ‡ means that the model uses image attributes during training. * denotes the use of additional information (e.g. extra-captions/text) at training time. The average of 3 runs is reported.

TABLE 3A

| | | Challenge | R@10 | | | |
|---|---|---|---|---|---|---|
| Method | Backbone | Metric | Dress | Shirt | Toptee | Mean |
| JVSM* | mobilenet-v1 | 19.27 | 10.70 | 12.00 | 13.00 | 11.90 |
| ComposeAE | ResNet17 | 20.60 | — | — | — | 11.80 |

TABLE 3A-continued

| Method | Backbone | Challenge Metric | R@10 Dress | Shirt | Toptee | Mean |
|---|---|---|---|---|---|---|
| TIRG† | ResNet50 | 30.31 | 19.44 | 16.44 | 20.60 | 18.80 |
| VAL* | ResNet50 | 35.38 | 22.53 | 22.38 | 27.53 | 24.15 |
| Cross-modal ⟨m v t⟩ | ResNet50 | 26.37 | 14.96 | 12.77 | 17.90 | 15.18 |
| Arithmetic⟨m + r v t⟩ | ResNet50 | 34.18 | 21.93 | 18.41 | 25.55 | 21.92 |
| Model of FIG. 2 | ResNet50 | 31.24 | 18.34 | 16.88 | 20.45 | 18.56 |
| Model of FIG. 4 | ResNet 18 | 34.99 | 22.81 | 19.55 | 24.97 | 22.41 |
|  | ResNet50 | 36.62 | 22.72 | 20.99 | 26.25 | 23.28 |

TABLE 3B

| Method | Backbone | Challenge Metric | R@10 Dress | Shirt | Toptee | Mean |
|---|---|---|---|---|---|---|
| JVSM* | mobilenet-v1 | 19.27 | 25.90 | 27.10 | 26.90 | 26.63 |
| ComposeAE | ResNet17 | 20.60 | — | — | — | 29.40 |
| TIRG† | ResNet50 | 30.31 | 43.05 | 37.18 | 45.15 | 41.75 |
| VAL* | ResNet50 | 35.38 | 44.00 | 44.15 | 51.68 | 46.61 |
| Cross-modal ⟨m v t⟩ | ResNet50 | 26.37 | 35.90 | 32.38 | 44.31 | 37.45 |
| Arithmetic⟨m + r v t⟩ | ResNet50 | 34.18 | 46.62 | 40.74 | 51.81 | 46.32 |
| Model of FIG. 2 | ResNet50 | 31.24 | 42.79 | 39.25 | 49.72 | 43.92 |
| Model of FIG. 4 | ResNet18 | 34.99 | 47.50 | 43.47 | 51.68 | 47.49 |
|  | ResNet50 | 36.62 | 48.93 | 44.86 | 55.96 | 49.85 |

TABLE 4A

| Method | Backbone | Challenge Metric | R@10 Dress | Shirt | Toptee | Mean |
|---|---|---|---|---|---|---|
| RNN Dialog | EfficientNet | 9.95 | 6.25 | 3.86 | 3.03 | 4.38 |
| Transf. Dialog | EfficientNet | 21.57 | 12.45 | 11.05 | 11.24 | 11.58 |
| TIRG† | ResNet50 | 30.23 | 20.32 | 16.10 | 20.15 | 18.86 |
| Cross-modal ⟨m v t⟩ | ResNet50 | 25.97 | 14.93 | 13.37 | 18.01 | 15.45 |
| Arithmetic⟨m + r v t⟩ | ResNet50 | 34.26 | 23.46 | 19.11 | 24.00 | 22.20 |
| Model of FIG. 4 | ResNet18 | 34.80 | 24.31 | 19.20 | 24.43 | 22.66 |
|  | ResNet50 | 35.99 | 24.64 | 20.00 | 25.59 | 23.42 |

TABLE 4B

| Method | Backbone | Challenge Metric | R@50 Dress | Shirt | Toptee | Mean |
|---|---|---|---|---|---|---|
| RNN Dialog | EfficientNet | 9.95 | 20.26 | 13.95 | 12.34 | 15.52 |
| Transf. Dialog | EfficientNet | 21.57 | 35.21 | 28.99 | 30.45 | 31.55 |
| TIRG† | ResNet50 | 30.23 | 43.41 | 38.25 | 43.13 | 41.60 |
| Cross-modal ⟨m v t⟩ | ResNet50 | 25.97 | 36.88 | 32.52 | 40.09 | 36.52 |
| Arithmetic⟨m + r v t⟩ | ResNet50 | 34.26 | 48.24 | 42.90 | 47.88 | 46.35 |
| Model of FIG. 4 | ResNet18 | 34.80 | 48.99 | 42.73 | 49.14 | 46.97 |
|  | ResNet50 | 35.99 | 50.50 | 44.42 | 50.80 | 48.59 |

On the validation split, the search module disclosed herein outperforms by an average 3% margin on R@50 and by 1.2% in the challenge metric. Furthermore, when trained on top of ResNet18 the approach described herein also outperforms others on R@50, while having a less complex architecture and lighter attention mechanisms. The model is compared to available dialog results as the model is not adapted for sequential user feedback. The search modules herein outperform all other methods and baselines with either a ResNet18 or ResNet50 as backbone. The best model improves upon the best baseline by an average of 1.7% over all metrics.

Table 5 reports results on the Shoes dataset. † means an implementation of the TIRG model described by Vo N. et al. and ‡ means that the model uses image attributes during training. * denotes the use of additional information (e.g. extra-captions/text) at training time. ResNet50 is used as a backbone. The average of 3 runs is reported. The exact same training setting are used as for FashionIQ, as the Shoes dataset is not provided with a validation set and its size deters cutting one from the training set. Reported results for the model of FIG. 4 may be lower than actual since the hyperparameters validated for FashionIQ are reused. The search modules described herein outperform TIRG and perform almost on par with other methods despite not leveraging side information.

TABLE 5

| Method | R@1 | R@10 | R@50 |
|---|---|---|---|
| TIRG† | 12.59 | 44.65 | 72.00 |
| VAL* | 17.18 | 51.52 | 75.83 |
| Cross-modal ⟨ m ∨ t⟩ | 2.29 | 13.80 | 32.03 |
| Arithmetic⟨ m + r ∨ t⟩ | 14.01 | 46.23 | 72.93 |
| Model of FIG. 4 | 16.15 | 49.44 | 75.92 |

Qualitative Results

Figure 5:
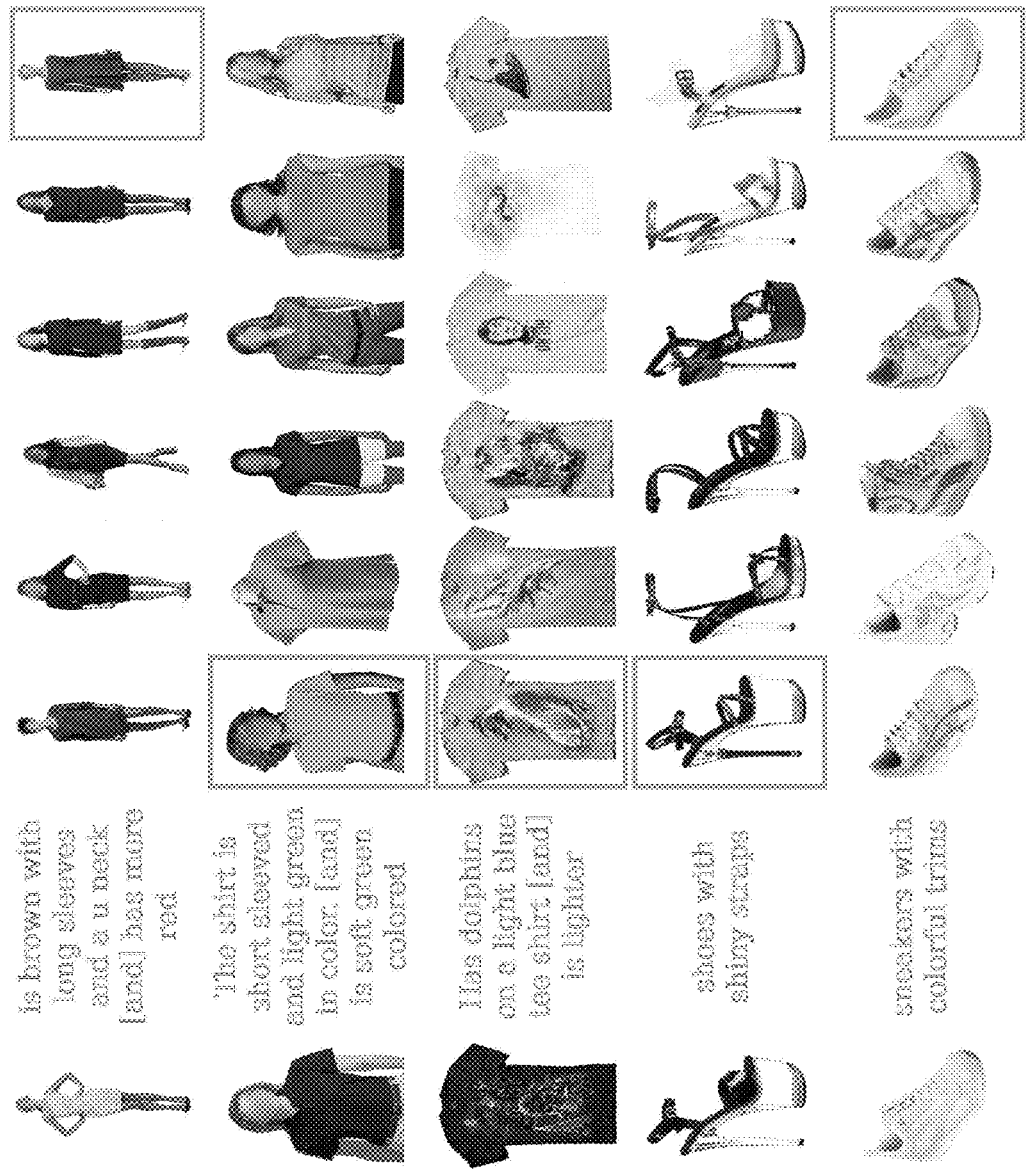
FIG. 5 illustrates images retrieved for a given query by the search module of FIG. 4.

FIG. 5 illustrates the model's ability to properly encode fashion concepts such as color, the sleeve length, or the form of the neck, but also more complex information, such as dolphins in a logo or shiny shoe straps. Queries are shown in the two leftmost columns and the qualitative results from the three fashion categories of FashionIQ and for two examples from shoes are shown in the remaining columns. The expected targets are indicated with a border. While the model involves the relative captions to propose coherent images, it also resorts to the reference image when important information is missing, such as the dress length, the shirt style, or the presence of transparent heels. This confirms the importance of using the text modifier to attend the two images and to study their similarity.

One limitation inherent to the task is well illustrated by the dress example: very often, many candidate target images would be totally acceptable answers to a given query, beyond the one annotated as ground-truth. Hence R@50 may be a more reliable metric. There may be limitations on relying on R@K for retrieval tasks when K is too small.

Figure 6:
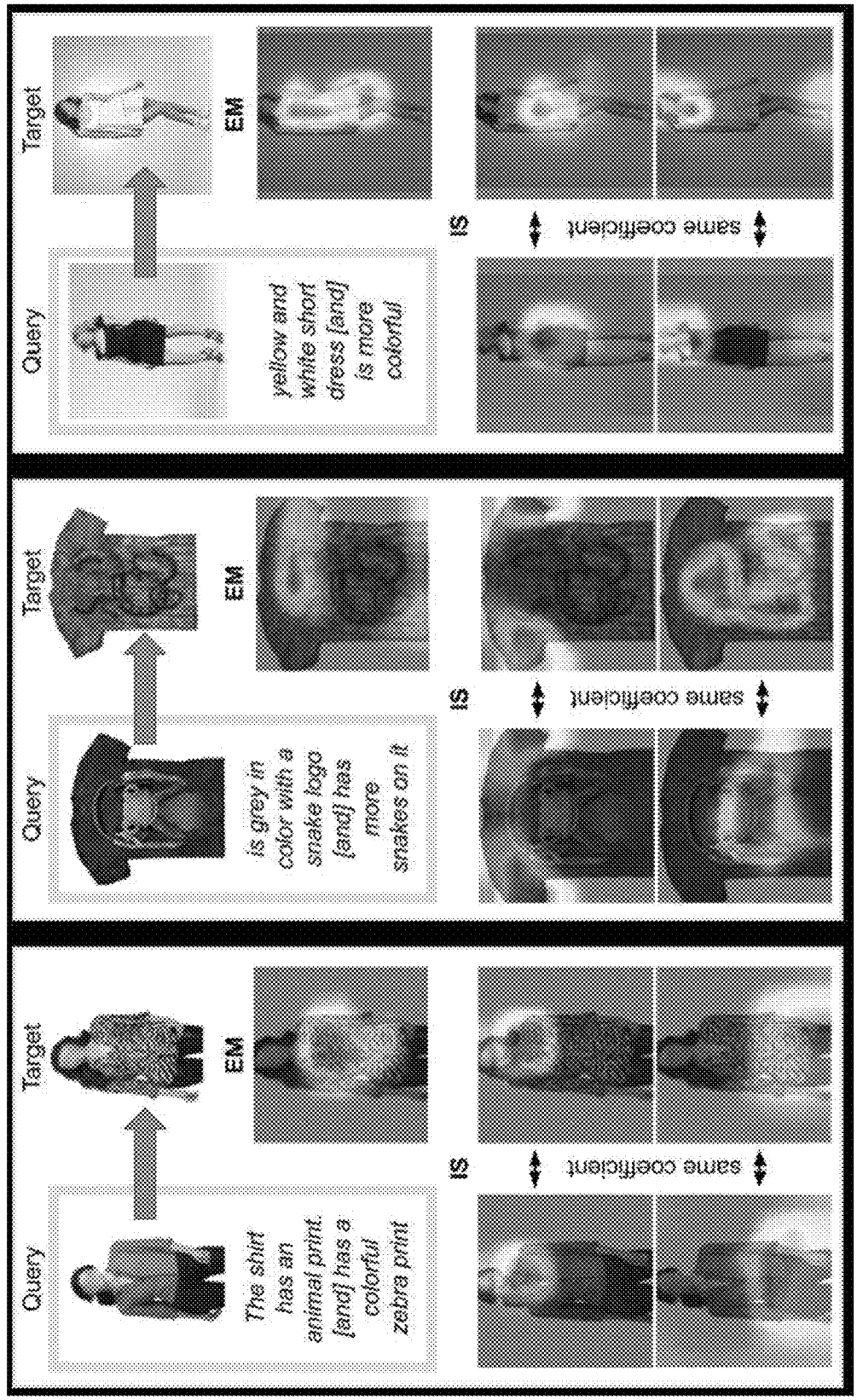
FIG. 6 illustrates a visualization of image parts contributing to compatibility scores obtained by the search module of FIG. 4.

FIG. 6 illustrates visualization of image parts contributing the most to the explicit matching (EM) and implicit similarity (IS) scores, for three queries where the correct target image is ranked first. An explicit matching component is presented on the target image. The bottom two rows show two relevant components for implicit similarity, applied to both the reference and the target images. The heatmaps presented in FIG. 6 are obtained with the Grad-CAM algorithm described in Selvaraju R. R. et al., Grad-cam: Visual explanations from deep networks via gradient-based localization, Proc ICCV, pages 618-626, 2017).

The image activations at the last convolutional layer of the CNN are reweighed with the pooled gradients of the same layer, after back-propagation of the coefficients contributing the most to the explicit matching and implicit similarity scores. The implicit similarity module attends to the visual cues that are similar between the reference and the target images, such as the form of the collar, the length of the sleeves, or of the dress, or a similar animal logo. In a complementary way, the explicit matching module addresses the image parts that are the most related to the caption: for example, it focuses on the pattern or the color.

Figure 7:
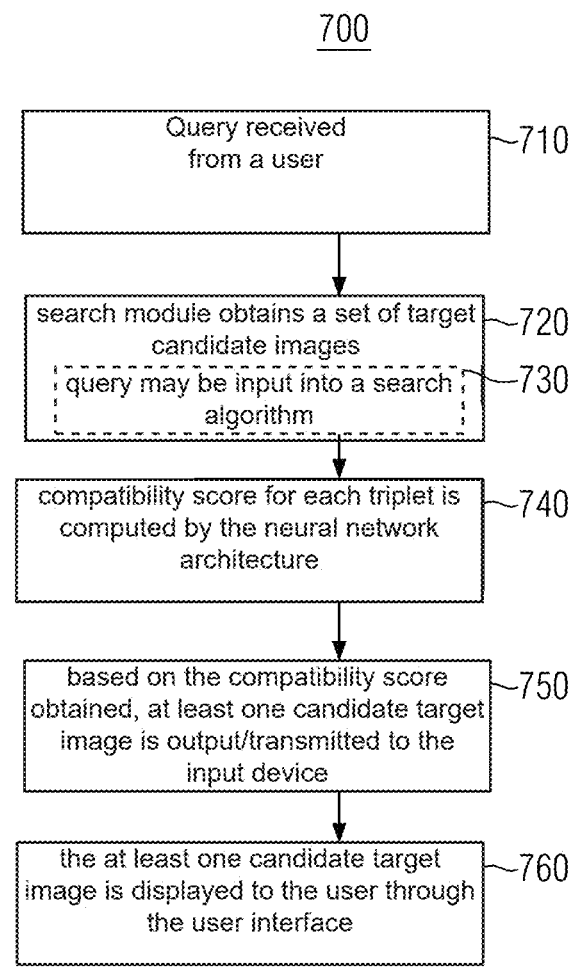
FIG. 7 is a flow diagram illustrating a method of retrieving images using the search module of FIG. 2 or the search module of FIG. 4.
Figure 8A:
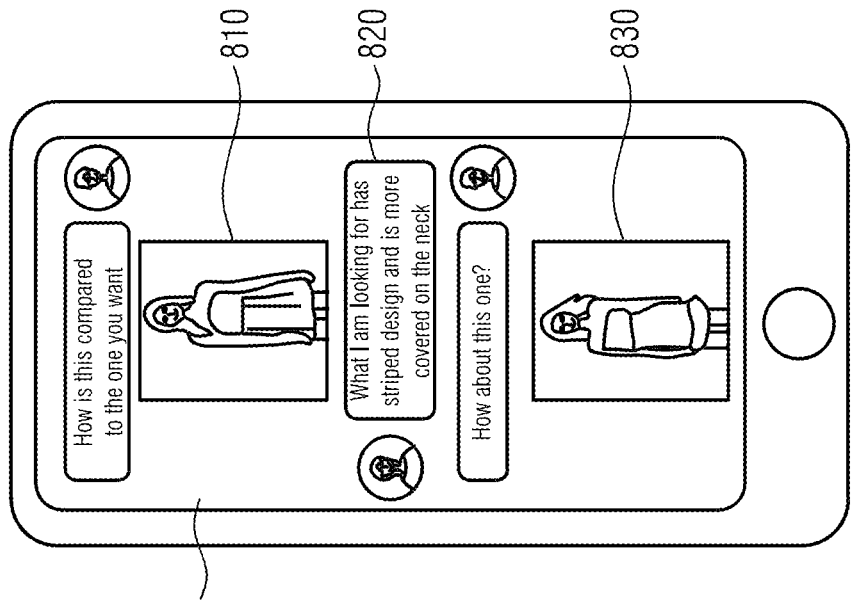
FIGS. 8A and 8B illustrate a user interface for retrieving images.

FIG. 7 is a flow diagram illustrating a method of searching for and retrieving images using the search modules described in FIG. 2 or FIG. 4 above. The method begins at 710, where a query is received from a user. The query includes a reference image and a text modifier. The user may input the query through a user interface, such as the user interface 800 of the input device, such illustrated in FIG. 8A. The query may be input by the user in any suitable manner. For example, the reference image 810 may be uploaded by the user or may be selected from at least one image displayed on the user interface 800. For example, a website or application may display one or more images to the user for selection by the user. If the user has already entered a query into the user interface, the one or more images may include at least one image that has been output by the search module in response to the (initial) query. The text modifier may be entered manually by the user into a text field 820 provided by the user interface 800 for this purpose. Additionally or alternatively, a menu may be provided for the user to select one or more elements (descriptions of visual differences) of the text modifier. In various implementations, the text modifier may be spoken and the spoken words may be converted to text via speech to text conversion.

At 720, the search module obtains a set of target candidate images. The target candidate images may be obtained from the data store 120 (e.g., memory), such as a database, that stores images. The target candidate images may include all of the images stored in the data storage. Alternatively, the candidate target images may be a subset of the images stored in the data storage. For example, at 730, the query may be input into a search algorithm that uses a cross-modal model or a query-composition retrieval model. Based on the query, the search algorithm may rank the images stored in the data storage in order of similarity to the query. A subset of the images including a predetermined number of the highest-ranking images may be output by the search algorithm as the candidate target images.

At 740, the compatibility score for each triplet is computed by the neural network architecture as described above with respect to FIG. 2 or FIG. 4. Then, at 750, based on the compatibility score obtained, at least one candidate target image is output/transmitted to the input device.

Figure 8B:
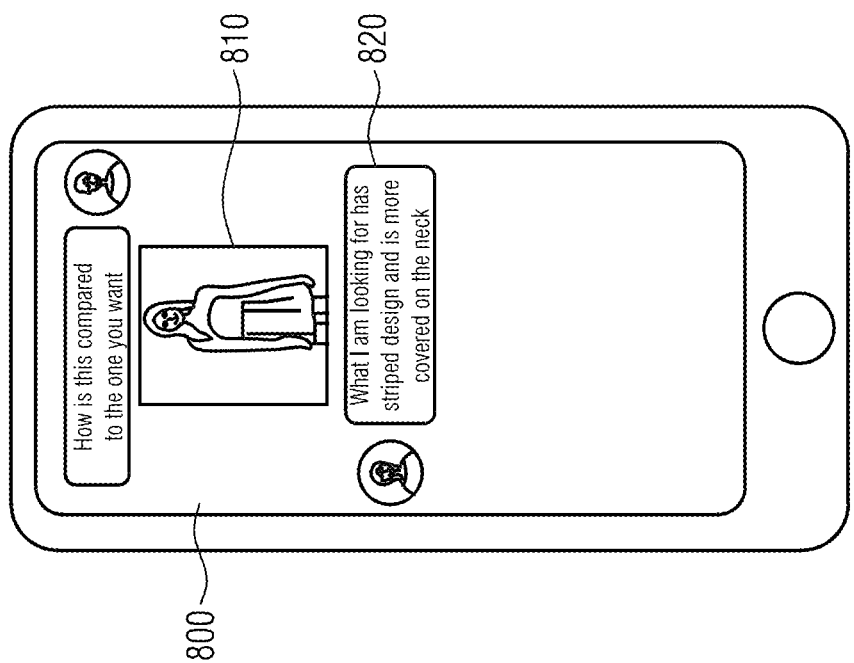

At 760, the at least one candidate target image 830 is displayed to the user through the user interface 800, such as shown in FIG. 8B. One candidate target image corresponding to the target image resulting from the query may be output and displayed by the user interface 800. Additionally or alternatively, a list of candidate target images having a compatibility score above a predetermined threshold value or the candidate target images having the highest k compatibility scores may be output and displayed. The candidate target images in the list may be ranked and displayed in order (e.g., decreasing rank) according to the compatibility score of their respective triplet.

In response to the display of at least one candidate target image on the user interface 800 of the input device, the user may select one of the at least one candidate target images as a (new) reference image. The user may input a second text modifier corresponding to the candidate target image (i.e., the new reference image). Thus, a second query may be input into the search module, where the query is based at least in part on a previous output of the search module. 710 to 760 may then be repeated to obtain a second at least one target image. This process may be repeated until the user is satisfied with the at least one candidate target image output by the search module and displayed on the user interface.

Figure 9:
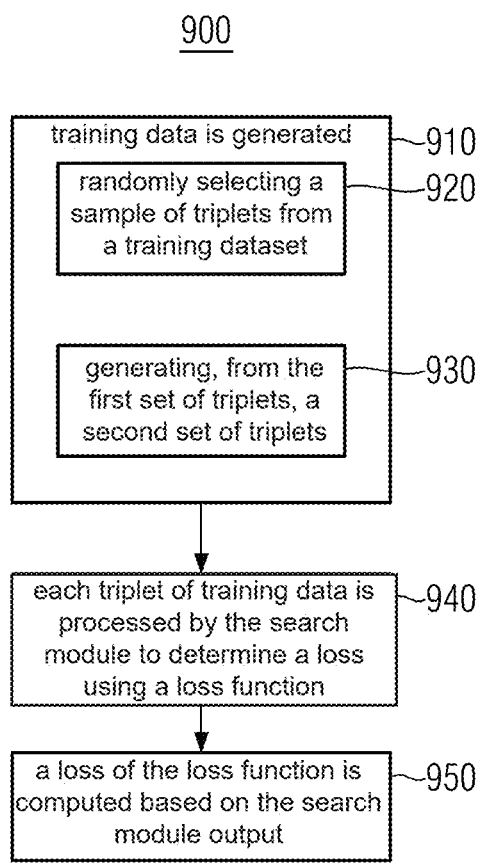
FIG. 9 is a flow diagram illustrating a method of training the search module of FIG. 2 or the search module of FIG. 4 to retrieve images.

FIG. 9 is a flow diagram illustrating a method 900 of training the search module of FIG. 2 or FIG. 4 to rank images and provide target images. The training of FIG. 9 and the training discussed herein may be performed by a training module 500 (FIGS. 2 and 4) using a training dataset.

The method begins at 910, where a batch of training data is generated. Generating the batch of training data first includes at 920 obtaining a first set of triplets by randomly selecting a sample of triplets from a training dataset. Each triplet of the training dataset includes a reference image, a text modifier and a target image, where the target image corresponds to the reference image modified according to the text modifier. For example, the reference image may be an image of a black dress with long sleeves, the text modifier may be "is red with no sleeves" and the target image may be an image of a sleeveless red dress. Thus, the triplets of the first set of triplets may be referred to as "correct triplets" or "compatible triplets".

Generating the batch of training data includes at 930 generating, from the first set of triplets, a second set of triplets. Each triplet of the second set of triplets includes a reference image, a text modifier, and a target image. However, in the second set of triplets the target image does not correspond to the reference image modified according to the text modifier. For example, the reference image may be an image of a black dress with long sleeves, the text modifier may be "is red with no sleeves" and the target image may be an image of a blue dress with sleeves. Thus, the triplets of the second set of triplets may be referred to as "incorrect triplets" or "incompatible triplets". The goal of the training is to determine as compatible the elements from a compatible triplet, and to determine as incompatible the elements that are not related through an incompatible triplet.

There are multiple ways to create incorrect combinations of triplet elements to generate the incompatible triplets. For example, starting from a given triplet of the first set of triplets, the (ground truth) target image may be replaced by another target image coming from another triplet. The incorrect combination that is the most natural with regard to the problem is obtained by sampling a target image from a different triplet than the one from which are extracted the reference image and the modifying text. In other words, given two triplets $triplet_a = \{r_a, t_a, m_a\}$ and $triplet_b = \{r_b, t_b, m_b\}$:

$[r_a, m_a, t_a, m_a]$ is a correct combination. The search module should output $S(r_a, m_a, t_a, m_a) = C_{r_a, t_a, m_a} = 1$.

$[r_a, m_a, t_b, m_a]$ is an incorrect combination. The search module should output $(r_a, m_a, t_b, m_a) = c_{r_a, t_b, m_a} = 0$.

Such an incorrect combination can be referred to as a "target-dissident combination" (TDC) in the sense that all the elements of the combination are part of the same annotation triplet, but for the target (which is then in the minority, and disagrees with the query elements). This is a particular incorrect combination since assigning it a compatibility score of 1 should be avoid as this would result in the search module retrieving an incorrect target image for a given query. Thus, in various implementations, target-dissident combinations are built by randomly pairing annotation triplets within each batch, and swapping the target images. However, in various implementations, additionally or alternatively, the reference image (and/or the modifying text) may be replaced with a reference image (or modifying text) from another triplet.

At 940, each triplet of the batch of training data is processed by the search module in order to determine a loss using a loss function, as described above.

In response to determining that there are no remaining unprocessed samples in the batch, at 950 a loss of the loss function is computed based on the search module output. The computed loss function is used to update at least some of the learnable parameters of the neural network modules of at least the interaction modules and the compatibility module. For example, a backpropagation method may be used to determine or update one or more parameters of one or more layers of the neural networks based on a difference between the ground truth label and the output estimated label from the search module. The backpropagation method may optimize the parameters by minimizing the loss function with respect to all the parameters in the neural networks, for example.

While some specific embodiments have been described in detail above, it will be apparent to those skilled in the art that various modifications, variations and improvements of the embodiments may be made in the light of the above teachings and within the content of the appended claims without departing from the intended scope of the embodiments. In addition, those areas in which it is believed that those of ordinary skill in the art are familiar have not been described herein in order not to unnecessarily obscure the embodiments described herein. Accordingly, it is to be understood that the embodiments are not to be limited by the specific illustrative embodiments, but only by the scope of the appended claims.

Although the above embodiments have been described in the context of method steps, they also represent a description of a corresponding component, module or feature of a corresponding apparatus or system.

Some or all of the method steps may be implemented by a computer in that they are executed by (or using) a processor, a microprocessor, an electronic circuit or processing circuitry.

The embodiments described above may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

Generally, embodiments can be implemented as a computer program product with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor. In a further embodiment, an apparatus comprises one or more processors and the storage medium mentioned above.

In a further embodiment, an apparatus comprises means, for example processing circuitry like e.g. a processor communicating with a memory, the means being configured to, or adapted to, perform one of the methods described herein.

A further embodiment comprises a computer having installed thereon the computer program or instructions for performing one of the methods described herein.

Figure 10:
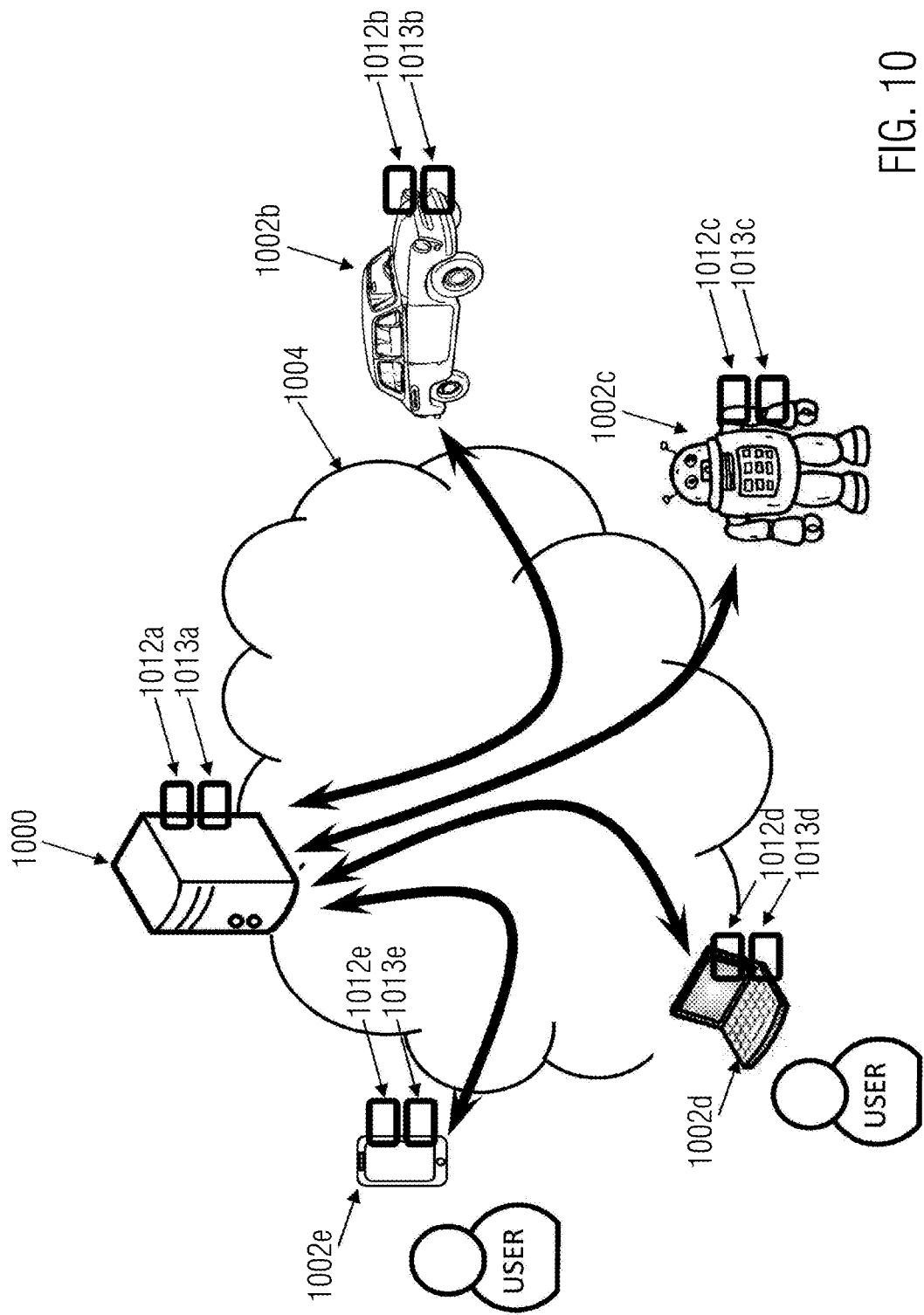
FIG. 10 illustrates an example of architecture in which the disclosed methods may be performed.

The above-mentioned methods and embodiments may be implemented within an architecture such as illustrated in FIG. 10, which comprises server 1000 and one or more computing devices 1002 that communicate over a network 1004 (which may be wireless and/or wired) such as the Internet for data exchange. Server 1000 and the computing devices 1002 include a data processor 1012 and memory 1013 such as a hard disk. The computing devices 1002 may be any computing device that communicates with server 1000, including autonomous vehicle 1002b, robot 1002c, computer 1002d, cell phone 1002e, and other types of computing devices.

More precisely in an embodiment, the techniques according to the embodiments above may be performed at server 1000. In other embodiments, the techniques according to the embodiments above may be performed at a computing device 1002. In yet other embodiments, the techniques described in said embodiments may be performed at a different server or on a plurality of servers in a distributed manner.

The invention is defined in the claims. However, below there is provided a non-exhaustive list of non-limiting examples. Any one or more features of these examples may be combined with any one or more features of another example, embodiment, or aspect described herein.

Example Ex1: A system for image retrieval with neural networks, the system comprising: an interaction module comprising: a first text-image interaction neural network trained to generate a vector representation of a first text-image pair based on an encoder representation of a reference image, r, and an encoder representation of a text modifier, m, wherein the text modifier, m, describes at least one visual difference between a target image, t, and the reference image, r, and a second text-image interaction neural network trained to generate, for each candidate target image, it, of a set of candidate target images, a vector representation of a second text-image pair based on the encoder representation of the text modifier, m, and an encoder representation of a respective candidate target image, $t_i$; and a compatibility module configured to compute, based on the vector representation of the first text-image pair and the vector representation of the second text-image pair, a compatibility score for each triplet of a set of triplets <r, $t_i$, m>, each triplet comprising the reference image, r, a candidate target image, $t_i$, of the set of candidate target images and the text modifier, m, wherein the compatibility score for each triplet is proportional to a degree to which the respective candidate target image corresponds to the target image such that the compatibility score is used to rank the candidate target images, $t_i$, in order of similarity to the target image, t.

Example Ex2: The system according to example Ex1, wherein computing the compatibility score based on the vector representation of the first text-image pair and the vector representation of the second text-image pair comprises computing a cosine similarity between the vector representation of the first text-image pair and the vector representation of the second text-image pair.

Example Ex3: The system according to example Ex2, wherein computing the compatibility score based on the vector representation of the first text-image pair and the vector representation of the second text-image pair further comprises computing a cosine similarity between the vector representation of the second text-image pair and the encoder representation of the text modifier, and wherein the compatibility score is based on a sum of the cosine similarity between the vector representation of the first text-image pair and the vector representation of the second text-image pair and the cosine similarity between the vector representation of the second text-image pair and the encoder representation of the text modifier.

Example Ex4: The system according to any of examples Ex1 to Ex3, wherein the first text-image interaction neural network uses a first attention mechanism on the text modifier and applied to the reference image to generate the vector representation of the first text-image pair, and the second text-image interaction neural network uses a second attention mechanism on the text modifier and applied to a respective candidate target image to generate the vector representation of the second text-image pair.

Example Ex5: The system according to example Ex1, wherein the compatibility module comprises a compatibility neural network trained to compute the compatibility score for each triplet of the set of triplets.

Example Ex6: The system according to example Ex1 or Ex5 wherein the interaction module further comprises an image-image interaction neural network trained to generate, for each candidate target image, $t_i$, of the set of candidate target images, a vector representation of an image-image pair based on the encoder representation of the reference image, r, and the encoder representation of a respective candidate target image, $t_i$, wherein the compatibility score is further based on the vector representation of the image-image pair.

Example Ex7. The system according to example Ex6, wherein the image-image interaction neural network is a multi-layer perceptron, MLP, neural network.

Example Ex8. The system according to any of examples Ex1 or Ex5 to Ex7 wherein the first text-image interaction neural network is a first text-enhanced image retrieval, TIRG, neural network and the second text-image interaction neural network is a second text-enhanced image retrieval, TIRG, neural network.

Example Ex9: The system according to any of examples Ex1 or Ex5 to Ex7, wherein the first text-image interaction neural network is a first multi-layer perceptron, MLP, neural network and wherein the second text-image interaction neural network is a second multi-layer perceptron, MLP, neural network.

Example Ex10: The system according to any of examples Ex1 to Ex9, wherein the neural networks are trained using a training data set that comprises compatible triplets and incompatible triplets, wherein each compatible triplet comprises a candidate target image that corresponds to a reference image of the respective compatible triplet modified according to a text modifier of the respective compatible triplet, and wherein an incompatible triplet comprises a candidate target image that does not correspond to a reference image of the respective incompatible triplet modified according to a text modifier of the respective incompatible triplet.

Example Ex11: The system according to example Ex10, wherein each incompatible triplet is generated from a pair of compatible triplets.

Example Ex12: The system according to any of examples Ex1 to Ex11, further comprising: at least one visual encoder neural network trained to generate the encoder representation of the reference image, r and the encoder representation of the candidate target images, $t_i$; and a textual encoder neural network trained to generate the encoder representation of the text modifier, m.

Example Ex13: The system according to example Ex12, wherein the at least one visual encoder neural network and the textual encoder neural network are trained using cross-modal retrieval prior to training the neural networks of the first interaction module, the second interaction module and the compatibility module.

Example Ex14: The system according to any of examples Ex1 to Ex13, further comprising a query input module configured to display, on a user interface, a list of the candidate target images ranked in according to the compatibility score.

Example Ex15: The system according to example Ex14, wherein the query input module is configured to receive, via the user interface, a query comprising the reference image, r, and the text modifier, m.

Example Ex16: The system according to any of examples Ex1 to Ex15, further comprising a pre-ranking module configured to, in response to receiving the query, rank candidate target images stored in a database of candidate target images using a cross-modal model or query-composition retrieval model.

Example Ex17: A computer-implemented method for image retrieval, comprising: receiving a query for obtaining a target image, t, the query comprising a reference image, r, and a text modifier, m, wherein the text modifier describes at least one visual difference between the target image, t, and the reference image, r, generating a vector representation of a first text-image pair based on an encoder representation of the reference image, r, and an encoder representation of the text modifier, m; generating, for each candidate target image, $t_i$, of a set of candidate target images, a vector representation of a second text-image pair based on the encoder representation of the text modifier, m, and an encoder representation of a respective candidate target image, $t_i$; and computing, based on the vector representation of a first text-image pair and the vector representation of a second text-image pair, a compatibility score for each triplet of a set of triplets $\langle r, t_i, m \rangle$, each triplet comprising the reference image, r, a candidate target image, $t_i$, of a set of candidate target images and the text modifier, m, wherein the compatibility score for each triplet is proportional to a degree to which the respective candidate target image corresponds to the target image such that the compatibility score is used to rank the candidate target images, $t_i$, in order of similarity to the target image, t.

Example Ex18: The method according to example Ex17, wherein computing the compatibility score comprises computing a cosine similarity between the vector representation of the first text-image pair and the vector representation of the second text-image pair.

Example Ex19: The method according to example Ex18, wherein computing the compatibility score further comprises computing a cosine similarity between the vector representation of the second text-image pair and the encoder representation of the text modifier, and wherein the compatibility score is based on a sum of the cosine similarity between the vector representation of the first text-image pair and the vector representation of the second text-image pair and the cosine similarity between the vector representation of the second text-image pair and the encoder representation of the text modifier.

Example Ex20: The method according to any of examples Ex17 to Ex19, wherein the vector representation of the first text-image pair is generated using a first attention mechanism on the text modifier and applied to the reference image to generate the vector representation of the first text-image pair, and wherein the vector representation of the second text-image pair is generated using a second attention mechanism on the text modifier and applied to a respective candidate target image to generate the vector representation of the second text-image pair.

Example Ex21: The method according to example Ex17, wherein computing the compatibility score comprises inputting the vector representation of the first text-image pair and the vector representation of the second text-image pair into a compatibility neural network, wherein the compatibility neural network is trained to output the compatibility score based on the input.

Example Ex22: The method according to example Ex17 or Ex21, wherein the first trained text-image interaction neural network is a first text-enhanced image retrieval, TIRG, neural network and the second trained text-image interaction neural network is a second text-enhanced image retrieval, TIRG, neural network.

Example Ex23: The method according to example Ex17 or Ex21, wherein the first trained text-image interaction neural network is a first multi-layer perceptron, MLP, neural network, and wherein the second trained text-image interaction neural network is a second multi-layer perceptron, MLP, neural network.

Example Ex24: The method according to any of examples Ex17 or Ex21 to Ex23, wherein the compatibility score is further based on third embedding of an image-image pair, wherein the image-image pair comprises the reference image, r, and the respective target image, $t_i$.

Example Ex25: The method according to any of examples Ex17 or Ex21 to Ex24, further comprising generating the vector representation of the image-image pair using a multi-layer perceptron, MLP, neural network.

Example Ex26: The method according to any of examples Ex17 to Ex25, further comprising obtaining the set of candidate target images by inputting the query into a cross-modal model or query-composition retrieval model to rank candidate target images stored in a database of candidate target images.

Example Ex27: The method according to any of examples Ex17 to Ex26, further comprising ranking, based on the compatibility score, the candidate target images, $t_i$, with respect to the target image, t.

Example Ex28: The method according to any of examples Ex17 to Ex27, further comprising, displaying a list of candidate target images ranked, based on the compatibility score, with respect to the target image.

Example Ex29: A method of training a neural network architecture to retrieve images, comprising: generating a training batch, comprising: obtaining a first set of triplets, each triplet, $\langle r_a, t_a, m_a \rangle$, of the first set of triplets comprising a reference image, r, a text modifier, m, and a target image, t, corresponding to the reference image, r, modified according to the modifier, m; and generating, from the first set of triplets, a second set of triplets, $\langle r_b, t_b, m_b \rangle$, each triplet of the second set of triplets comprising the reference image, r, a text modifier, m, and a target image, t, that does not correspond to the reference image, r, modified according to the modifier, m; processing all the triplets of the training batch by: randomly selecting a triplet of the training batch; inputting an encoder representation of the reference image, r, of the selected triplet and an encoder representation of the text modifier, m, of the selected triplet into a first text-image interaction neural network to generate a vector representation of a first text-image pair; inputting an encoder representation of the target image, t, of the selected triplet and the encoder representation of the text modifier, m, of the selected triplet into a second text-image interaction neural network to generate a vector representation of a second text-image pair; generating, based on the first vector representation of the first text-image pair and the vector representation of the second text-image pair, a prediction whether the triplet is obtained from the first set of triplets or the second set of triplets; and calculating, based on the prediction a loss value through a loss function; and once it is determined that there are no remaining unselected triplets in the training batch, modifying the learnable parameters of the neural network architecture according to the loss value.

Example Ex30: The method according to example Ex29, wherein generating, from the first set of triplets, a second set of triplets, $\langle r_b, t_b, m_b \rangle$, comprises at least one of: randomly pairing the triplets within the first set of triplets and, for each pair of triplets, swapping the respective target images; randomly pairing the triplets within the first set of triplets and, for each pair of triplets, swapping the respective reference images; randomly pairing the triplets within the first set of triplets and, for each pair of triplets, swapping the respective text modifiers; for a randomly selected triplet within the first set of triplets, swapping respective target images with each other triplet within the first set of triplets; for a randomly selected triplet within the first set of triplets, swapping respective reference images with each other triplet within the first set of triplets; for a randomly selected triplet within the first set of triplets, swapping respective text modifiers with each other triplet within the first set of triplets.

Example Ex31: The method according to example Ex29 or Ex30, wherein generating the prediction comprises computing a cosine similarity between the vector representation of the first text-image pair and the vector representation of the second text-image pair.

Example Ex32: The method according to example Ex31, wherein generating the prediction further comprises computing a cosine similarity between the vector representation of the second text-image pair and the encoder representation of the text modifier, and wherein the prediction is based on a sum of the cosine similarity between the vector representation of the first text-image pair and the vector representation of the second text-image pair and the cosine similarity between the vector representation of the second text-image pair and the encoder representation of the text modifier.

Example Ex33: The method according to any of examples Ex29 to Ex32, wherein the first text-image interaction neural network uses a first attention mechanism on the text modifier and applied to the reference image to generate the vector representation of the first text-image pair, and the second text-image interaction neural network uses a second attention mechanism on the text modifier and applied to a respective candidate target image to generate the vector representation of the second text-image pair.

Example Ex34: The method according to any of examples Ex29 to Ex31, wherein generating the prediction comprises inputting, into a compatibility neural network, the vector representation of the first text-image pair and the vector representation of the second text-image pair.

Example Ex35: The method according to example Ex33, further comprising: inputting an encoder representation of the reference image, r, of the selected triplet and an encoder representation of the target image, t, of the selected triplet into an image-image interaction neural network neural network to generate a vector representation of an image-image pair, wherein generating the prediction further comprises inputting, into the image-image representation neural network, the embedding of the image-image pair.

Example Ex36: A computing system comprising: a processor; and a computer-readable storage medium having computer-implemented instructions stored thereon, which when executed by the processor, cause the processor to perform the method according to one of examples Ex29 to Ex35.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCamI, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for image retrieval with neural networks, the system comprising:
an interaction module comprising:
a first text-image interaction neural network trained to generate a vector representation of a first text-image pair based on (a) an encoder representation of a reference image and (b) an encoder representation of a text modifier, the reference image and the text modifier received from a computing device,
wherein (i) the text modifier describes at least one visual difference from the reference image, and (ii) the first text-image interaction neural network is trained to use an attention mechanism to weigh dimensions of the encoder representation of the reference image; and
a second text-image interaction neural network trained to generate a vector representation of a second text-image pair based on (a) the encoder representation of the text modifier and (b) an encoder representation of a candidate target image,
wherein the second text-image interaction neural network is trained to use the attention mechanism to weigh dimensions of the encoder representation of the candidate target image;
a compatibility module configured to compute, based on (a) the vector representation of the first text-image pair and (b) the vector representation of the second text-image pair, a compatibility score for a triplet including the reference image, the text modifier, and the candidate target image; and
a ranking module configured to;
rank a set of candidate target images including the candidate target image by compatibility scores of the candidate target images, respectively, of the set; and
select at least one of the candidate target images from the set based on the ranks of the candidate target images, respectively; and
transmit the selected at least one of the candidate target images to the computing device;
wherein the attention mechanism is the text modifier.

2. The system of claim 1 wherein the compatibility module is configured to:
compute a cosine similarity between the vector representation of the first text-image pair and the vector representation of the second text-image pair; and
determine the compatibility score for the triplet based on the cosine similarity.

3. The system of claim 2 wherein the compatibility module is configured to:
compute a second cosine similarity between the vector representation of the second text-image pair and the encoder representation of the text modifier; and
determine the compatibility score for the triplet further based on the second cosine similarity.

4. The system of claim 3 wherein the compatibility module is configured to set the compatibility score for the triplet based on a sum of the cosine similarity and the second cosine similarity.

5. The system of claim 1 wherein:
the first text-image interaction neural network applies a first attention mechanism on the text modifier and the reference image to generate the vector representation of the first text-image pair; and
the second text-image interaction neural network applies a second attention mechanism on the text modifier and the candidate target image to generate the vector representation of the second text-image pair.

6. The system of claim 1, wherein the compatibility module includes a compatibility neural network configured to compute the compatibility score for the triplet.

7. The system of claim 1 wherein:
the interaction module further comprises an image-image interaction neural network trained to generate a vector representation of an image-image pair based on the encoder representation of the reference image and the encoder representation of the candidate target image; and
the compatibility module is configured to determine the compatibility score for the triplet further based on the vector representation of the image-image pair.

8. The system of claim 1, wherein the interaction module is trained based on compatible triplets and incompatible triplets,
wherein each compatible triplet includes a candidate target image that corresponds to a reference image of the respective compatible triplet modified according to a text modifier of the respective compatible triplet, and
wherein an incompatible triplet comprises a candidate target image that does not correspond to a reference image of the respective incompatible triplet modified according to a text modifier of the respective incompatible triplet.

9. The system of claim 1 wherein the ranking module is configured to rank the rank set of candidate target images including the candidate target image from highest compatibility score to lowest compatibility score.

10. The system of claim 1 further comprising a preranking module configured to select the set of candidate target images from a second set of candidate target images that includes more candidate target images than the set of candidate target images based on the reference image and the candidate target images of the second set of candidate target images.

11. The system of claim 10 wherein the pre-ranking module is configured to select the set of candidate target images from the second set using one of a cross-modal retrieval model and a query-composition retrieval model.

12. A method for image retrieval with neural networks, the method comprising:
generating a vector representation of a first text-image pair based on (a) an encoder representation of a reference image and (b) an encoder representation of a text modifier using a first text-image interaction neural network, the reference image and the text modifier received from a computing device, wherein the text modifier describes at least one visual difference from the reference image; wherein the first text-image interaction neural network is trained to use an attention mechanism to weigh dimensions of the encoder representation of the reference image;

generating a vector representation of a second text-image pair based on (a) the encoder representation of the text modifier and (b) an encoder representation of a candidate target image using a second text-image interaction neural network; wherein the second text-image interaction neural network is trained to use the attention mechanism to weigh dimensions of the encoder representation of the candidate target image;

computing, based on (a) the vector representation of the first text-image pair and (b) the vector representation of the second text-image pair, a compatibility score for a triplet including the reference image, the text modifier, and the candidate target image; and ranking a set of candidate target images including the candidate target image by compatibility scores of the candidate target images, respectively, of the set;

selecting at least one of the candidate target images from the set based on the ranks of the candidate target images, respectively; and transmitting the selected at least one of the candidate target images to the computing device;

wherein the attention mechanism is the text modifier.

13. The method of claim 12 wherein determining the compatibility score includes:

computing a cosine similarity between the vector representation of the first text-image pair and the vector representation of the second text-image pair; and determining the compatibility score for the triplet based on the cosine similarity.

14. The method of claim 13 wherein determining the compatibility score includes:

computing a second cosine similarity between the vector representation of the second text-image pair and the encoder representation of the text modifier; and determining the compatibility score for the triplet further based on the second cosine similarity.

15. The method of claim 14 wherein determining the compatibility score includes setting the compatibility score for the triplet based on a sum of the cosine similarity and the second cosine similarity.

16. The method of claim 12 wherein:

generating the vector representation of the first text-image pair includes generating the vector representation of the first text-image pair by applying a first attention mechanism on the text modifier and the reference image; and generating the vector representation of the second text-image pair includes generating the vector representation of the second text-image interaction neural network by applying a second attention mechanism on the text modifier and the candidate target image.

17. The method of claim 12, wherein determining the compatibility score includes determining the compatibility score for the triplet by a compatibility neural network.

18. The method of claim 12 wherein determining the compatibility score includes:

generating a vector representation of an image-image pair based on the encoder representation of the reference image and the encoder representation of the candidate target image; and determining the compatibility score for the triplet further based on the vector representation of the image-image pair.

19. The method of claim 12 further comprising training to generate the vector representations based on compatible triplets and incompatible triplets, wherein each compatible triplet includes a candidate target image that corresponds to a reference image of the respective compatible triplet modified according to a text modifier of the respective compatible triplet, and wherein an incompatible triplet comprises a candidate target image that does not correspond to a reference image of the respective incompatible triplet modified according to a text modifier of the respective incompatible triplet.

20. The method of claim 12 wherein the ranking includes ranking the set of candidate target images including the candidate target image from highest compatibility score to lowest compatibility score.

21. The method of claim 12 further comprising selecting the set of candidate target images from a second set of candidate target images that includes more candidate target images than the set of candidate target images based on the reference image and the candidate target images of the second set of candidate target images.

22. The method of claim 21 wherein selecting the set of candidate target images includes selecting the set of candidate target images from the second set using one of a cross-modal retrieval model and a query-composition retrieval model.

23. A method of training a-neural networks to retrieve images, the method:

generating a training dataset, comprising:

obtaining a first set of triplets, each triplet of the first set of triplets comprising a reference image, a text modifier, and a target image, corresponding to the reference image modified according to the text modifier, wherein the text modifier describes at least one visual difference from the reference image; and generating, from the first set of triplets, a second set of triplets, each triplet of the second set of triplets comprising the reference image, a text modifier, and a target image that does not correspond to the reference image modified according to the text modifier;

processing all the triplets of the training dataset by:

selecting a triplet of the training dataset;

inputting an encoder representation of the reference image of the selected triplet and an encoder representation of the text modifier of the selected triplet into a first text-image interaction neural network to generate a vector representation of a first text-image pair, the first text-image interaction neural network is trained to use an attention mechanism to weigh dimensions of the encoder representation of the reference image;

inputting an encoder representation of the target image of the selected triplet and the encoder representation of the text modifier of the selected triplet into a second text-image interaction neural network to generate a vector representation of a second text-image pair, the second text-image interaction neural network is trained to use the attention mechanism to weigh dimensions of the encoder representation of the candidate target image;

generating, using a compatibility neural network and based on the first vector representation of the first text-image pair and the vector representation of the second text-image pair, a prediction whether the selected triplet is obtained from the first set of triplets or the second set of triplets; and calculating, based on the prediction, a loss value using a loss function; and when all of the triplets have been processed, selectively modifying one or more learnable parameters of the neural networks based on the loss value;

wherein the attention mechanism is the text modifier.

24. The method of claim 23, wherein generating, from the first set of triplets, a second set of triplets, $<r_b, t_b, m_b>$, includes at least one of:

pairing the triplets within the first set of triplets and, for each pair of triplets, swapping the respective target images;

pairing the triplets within the first set of triplets and, for each pair of triplets, swapping the respective reference images;

pairing the triplets within the first set of triplets and, for each pair of triplets, swapping the respective text modifiers;

for a selected triplet within the first set of triplets, swapping respective target images with another triplet within the first set of triplets;

for a selected triplet within the first set of triplets, swapping respective reference images with another triplet within the first set of triplets; and for a selected triplet within the first set of triplets, swapping respective text modifiers with another triplet within the first set of triplets.

25. The method of claim 23, wherein generating the prediction comprises computing a cosine similarity between the vector representation of the first text-image pair and the vector representation of the second text-image pair.

26. The method of claim 25, wherein generating the prediction further comprises computing a cosine similarity between the vector representation of the second text-image pair and the encoder representation of the text modifier, and wherein the prediction is based on a sum of the cosine similarity between the vector representation of the first text-image pair and the vector representation of the second text-image pair and the cosine similarity between the vector representation of the second text-image pair and the encoder representation of the text modifier.

27. The method of claim 23, wherein the first text-image interaction neural network uses a first attention mechanism on the text modifier and the reference image to generate the vector representation of the first text-image pair, and the second text-image interaction neural network uses a second attention mechanism on the text modifier and applied to the a respective candidate target image to generate the vector representation of the second text-image pair.

28. The method of claim 23, wherein generating the prediction comprises, by a compatibility neural network, generating the prediction based on the vector representation of the first text-image pair and the vector representation of the second text-image pair.

29. A system for image retrieval with neural networks, the system comprising:

an interaction module comprising:

a first text-image interaction module configured to generate a vector representation of a first text-image pair based on (a) an encoder representation of a reference image and (b) an encoder representation of a text modifier, the reference image and the text modifier received from a computing device, wherein (i) the text modifier describes at least one visual difference from the reference image, and (ii) the first text-image interaction module is configured to generate the vector representation of the first text-image pair using a first neural network with attention that guides according to its input; and a second text-image interaction module configured to generate a vector representation of a second text-image pair based on (a) the encoder representation of the text modifier and (b) an encoder representation of a candidate target image, wherein the second text-image interaction module is configured to generate the vector representation of the second text-image pair using a second neural network with attention that guides according to the complement of its input;

a compatibility module configured to compute, based on (a) the vector representation of the first text-image pair and (b) the vector representation of the second text-image pair, a compatibility score for a triplet including the reference image, the text modifier, and the candidate target image; and a ranking module configured to;

rank a set of candidate target images including the candidate target image by compatibility scores of the candidate target images, respectively, of the set; and select at least one of the candidate target images from the set based on the ranks of the candidate target images, respectively; and transmit the selected at least one of the candidate target images to the computing device.

30. A method for image retrieval with neural networks, the method comprising:

generating a vector representation of a first text-image pair based on (a) an encoder representation of a reference image and (b) an encoder representation of a text modifier using a first neural network with attention that guides according to its input, the reference image and the text modifier received from a computing device, wherein the text modifier describes at least one visual difference from the reference image;

generating a vector representation of a second text-image pair based on (a) the encoder representation of the text modifier and (b) an encoder representation of a candidate target image using a second neural network with attention that guides according to the complement of its input;

computing, based on (a) the vector representation of the first text-image pair and (b) the vector representation of the second text-image pair, a compatibility score for a triplet including the reference image, the text modifier, and the candidate target image; and ranking a set of candidate target images including the candidate target image by compatibility scores of the candidate target images, respectively, of the set;

selecting at least one of the candidate target images from the set based on the ranks of the candidate target images, respectively; and transmitting the selected at least one of the candidate target images to the computing device.

31. A method of training neural networks to retrieve images, the method:

generating a training dataset, comprising:

obtaining a first set of triplets, each triplet of the first set of triplets comprising a reference image, a text modifier, and a target image, corresponding to the reference image modified according to the text modifier, wherein the text modifier describes at least one visual difference from the reference image; and generating, from the first set of triplets, a second set of triplets, each triplet of the second set of triplets comprising the reference image, a text modifier, and a target image that does not correspond to the reference image modified according to the text modifier;

processing all the triplets of the training dataset by:
  selecting a triplet of the training dataset;
  inputting an encoder representation of the reference image of the selected triplet and an encoder representation of the text modifier of the selected triplet into a first text-image interaction neural network to generate a vector representation of a first text-image pair, the first text-image interaction neural network configured to generate the vector representation of the first text-image pair using a first neural network with attention that guides according to its input;
  inputting an encoder representation of the target image of the selected triplet and the encoder representation of the text modifier of the selected triplet into a second text-image interaction neural network to generate a vector representation of a second text-image pair, the second text-image interaction neural network configured to generate the vector representation of the second text-image pair using a second neural network with attention that guides according to the complement of its input;
  generating, using a compatibility neural network and based on the first vector representation of the first text-image pair and the vector representation of the second text-image pair, a prediction whether the selected triplet is obtained from the first set of triplets or the second set of triplets; and
  calculating, based on the prediction, a loss value using a loss function; and when all of the triplets have been processed, selectively modifying one or more learnable parameters of the neural networks based on the loss value.

* * * * *